United States Patent
Fazeli et al.

(10) Patent No.: US 10,269,189 B2
(45) Date of Patent: *Apr. 23, 2019

(54) DUAL-STAGE, SEPARATED GAS/FLUID SHOCK STRUT SERVICING MONITORING SYSTEM USING ONE PRESSURE/TEMPERATURE SENSOR

(71) Applicant: Goodrich Corporation, Charlotte, NC (US)

(72) Inventors: Amir Fazeli, Mississauga (CA); Adnan Cepic, Mississauga (CA); Susanne M. Reber, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/642,129

(22) Filed: Jul. 5, 2017

(65) Prior Publication Data

US 2019/0012849 A1 Jan. 10, 2019

(51) Int. Cl.
 *G07C 5/00* (2006.01)
 *G07C 5/08* (2006.01)
 (Continued)

(52) U.S. Cl.
 CPC .............. *G07C 5/006* (2013.01); *F16F 9/062* (2013.01); *F16F 9/065* (2013.01); *F16F 9/3292* (2013.01);
 (Continued)

(58) Field of Classification Search
 CPC ......... B64C 25/60; F16F 9/061; F16F 9/3292; F16F 9/065; F16F 9/062; F16F 9/486;
 (Continued)

(56) References Cited

U.S. PATENT DOCUMENTS 2,471,294 A 5/1949 Watts
3,889,904 A 6/1975 Jones
(Continued)

FOREIGN PATENT DOCUMENTS

| EP | 2937592 | 10/2015 |
|---|---|---|
| EP | 3184423 | 6/2017 |
| WO | 2014184521 | 11/2014 |

OTHER PUBLICATIONS

Fazeli et al., "Dual-Stage, Pressure-Activated, Mixed Fluid Gas Shock Strut Servicing Monitoring System", U.S. Appl. No. 15/642,058, filed Jul. 5, 2017.

(Continued)

*Primary Examiner* — Yuen H Wong
(74) *Attorney, Agent, or Firm* — Snell & Wilmer, L.L.P.

(57) ABSTRACT

A monitoring system for a dual-stage, separated gas/fluid shock strut may comprise a controller and a tangible, non-transitory memory configured to communicate with the controller. The tangible, non-transitory memory may have instructions stored thereon that, in response to execution by the controller, cause the controller to perform various operations. Said operations may include calculating, by the controller, a secondary chamber nominal pressure, determining, by the controller, a shock strut stroke associated with the secondary chamber nominal pressure, calculating, by the controller, a volume of oil in an oil chamber of the shock strut, calculating, by the controller, a volume of gas in a primary chamber of the shock strut, calculating, by the controller, a secondary chamber inflation pressure, and calculating, by the controller, a volume of oil leaked into the primary chamber of the shock strut.

11 Claims, 12 Drawing Sheets

(51) Int. Cl.
*F16F 9/06* (2006.01)
*F16F 9/32* (2006.01)
*F16F 9/48* (2006.01)
F16F 15/02 (2006.01)
F16F 15/023 (2006.01)
B64C 25/60 (2006.01)

(52) U.S. Cl.
CPC ............ *F16F 9/486* (2013.01); *G07C 5/0808* (2013.01); *G07C 5/0825* (2013.01); *B64C 25/60* (2013.01); *F16F 15/022* (2013.01); *F16F 15/023* (2013.01); *F16F 2222/12* (2013.01); *F16F 2230/0047* (2013.01); *F16F 2230/183* (2013.01); *F16F 2236/045* (2013.01); *G07C 5/085* (2013.01)

(58) Field of Classification Search
CPC ........... F16F 2222/12; F16F 2230/0047; F16F 2236/045; F16F 15/023; F16F 15/022; F16F 2230/183; G07C 5/006; G07C 5/0825; G07C 5/0808; G07C 5/085
See application file for complete search history.

(56) References Cited

U.S. PATENT DOCUMENTS

| | | | |
|---|---|---|---|
| 5,148,896 | A | 9/1992 | Ralph |
| 5,548,517 | A | 8/1996 | Nance |
| 6,120,009 | A | 9/2000 | Gatehouse et al. |
| 6,293,141 | B1 | 9/2001 | Nance |
| 7,193,530 | B2 | 3/2007 | Nance |
| 7,552,803 | B2 | 6/2009 | Luce |
| 7,716,964 | B2 | 5/2010 | Kurtz et al. |
| 8,055,396 | B2 | 11/2011 | Yates et al. |
| 8,056,392 | B2 | 11/2011 | Ryan et al. |
| 8,180,504 | B1 | 5/2012 | Nance |
| 8,262,019 | B2 | 9/2012 | Schmidt |
| 8,275,515 | B2 | 9/2012 | Wright et al. |
| 8,565,968 | B2 | 10/2013 | Nance |
| 8,886,402 | B1 | 11/2014 | Lou |
| 8,919,182 | B2 | 12/2014 | Luce |
| 9,045,237 | B2 | 6/2015 | Nance |
| 9,285,007 | B2 | 3/2016 | Fazeli et al. |
| 9,342,481 | B2 | 5/2016 | Swearingen et al. |
| 9,387,924 | B2 | 7/2016 | Fazeli et al. |
| 9,446,859 | B2 | 9/2016 | Fazeli et al. |
| 9,541,151 | B2 | 1/2017 | Martin et al. |
| 2007/0069072 | A1 | 3/2007 | Luce |
| 2008/0033607 | A1 | 2/2008 | Zeliff |
| 2014/0046533 | A1 | 2/2014 | Nance |
| 2015/0266569 | A1 | 9/2015 | Fazeli et al. |
| 2015/0267769 | A1 | 9/2015 | Fazeli et al. |
| 2015/0269794 | A1 | 9/2015 | Fazeli et al. |
| 2016/0027225 | A1 | 1/2016 | Fazeli et al. |
| 2016/0101877 | A1 | 4/2016 | Shepherd et al. |
| 2016/0230831 | A1 | 8/2016 | Martin |
| 2017/0008647 | A1* | 1/2017 | Pountney ................ B64C 25/60 |
| 2017/0008648 | A1 | 1/2017 | Pountney et al. |
| 2017/0166329 | A1* | 6/2017 | Fazeli ................... B64F 5/0045 |

OTHER PUBLICATIONS

Fazeli et al., "Dual-Stage, Separated Gas/Fluid Shock Strut Servicing", U.S. Appl. No. 15/642,081, filed Jul. 5, 2017.
Fazeli et al., "Dual-Stage, Separated Gas/Fluid Shock Strut Servicing Monitoring System Using Two Pressure/Temperature Sensors", U.S. Appl. No. 15/642,098, filed Jul. 5, 2017.
Fazeli et al., "Dual-Stage, Stroke-Activated, Mixed Fluid Gas Shock Strut Servicing Monitoring System", U.S. Appl. No. 15/642,117, filed Jul. 5, 2017.
USPTO, Non Final Office Action dated Apr. 16, 2018 in U.S. Appl. No. 15/642,058.
USPTO, Pre-Interview First Office Action dated Jul. 25, 2018 in U.S. Appl. No. 15/642,098.
USPTO, Pre-Interview First Office Action dated Jul. 25, 2018 in U.S. Appl. No. 15/642,117.
European Patent Office, European Search Report dated Oct. 29, 2018 in Application No. 18181983.0-1010.
USPTO, First Action Interview Office Action dated Aug. 28, 2018 in U.S. Appl. No. 15/642,098.
European Patent Office, European Search Report dated Aug. 24, 2018 in Application No. 18163431.2-1013.
USPTO, First Action Interview Office Action dated Aug. 28, 2018 in U.S. Appl. No. 15/642,117.
USPTO, Non-Final Office Action dated Sep. 11, 2018 in U.S. Appl. No. 15/642,058.

* cited by examiner

DUAL-STAGE, SEPARATED GAS/FLUID SHOCK STRUT SERVICING MONITORING SYSTEM USING ONE PRESSURE/TEMPERATURE SENSOR

FIELD

The present disclosure relates to landing gear, and more particularly, to systems and methods for monitoring shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and take-off.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Performance of the shock strut assembly may degrade over time. Such degradation can cause damage to other components of the aircraft, including bearings of the landing gear assembly.

Functionality and performance of a landing gear shock strut may depend on internal gas and oil levels. Gas pressure and oil volume may be maintained within a design envelope to ensure that the landing gear functionality is within an acceptable range.

SUMMARY

A monitoring system for a dual-stage, separated gas/fluid shock strut is disclosed herein, in accordance with various embodiments. The monitoring system for a dual-stage, separated gas/fluid gas shock strut may comprise a controller and a tangible, non-transitory memory configured to communicate with the controller, the tangible, non-transitory memory having instructions stored thereon that, in response to execution by the controller, cause the controller to perform operations comprising: receiving, by the controller, a primary chamber temperature sensor reading; receiving, by the controller, a primary chamber pressure sensor reading; receiving, by the controller, a shock strut stroke sensor reading; calculating, by the controller, a secondary chamber nominal pressure based upon the primary chamber temperature sensor reading; determining, by the controller, a shock strut stroke associated with the secondary chamber nominal pressure; calculating, by the controller, a volume of oil in an oil chamber of the dual-stage, separated gas/fluid shock strut; calculating, by the controller, a volume of gas in a primary chamber of the dual-stage, separated gas/fluid shock strut based upon at least the volume of oil; calculating, by the controller, a secondary chamber inflation pressure; and calculating, by the controller, a volume of oil leaked into the primary chamber of the dual-stage, separated gas/fluid shock strut, based upon the secondary chamber inflation pressure.

In various embodiments, the instructions may cause the controller to perform further operations comprising calculating, by the controller, a number of moles of gas in the primary chamber of the dual-stage, separated gas/fluid shock strut, based upon at least the volume of gas in the primary chamber. The instructions may cause the controller to perform further operations comprising calculating, by the controller, a volume of gas in a secondary chamber of the dual-stage, separated gas/fluid shock strut, and calculating, by the controller, a number of moles of gas in the secondary chamber of the dual-stage, separated gas/fluid shock strut, based upon at least the volume of gas in the secondary chamber. The instructions may cause the controller to perform further operations comprising calculating, by the controller, a displacement volume of the secondary chamber of the dual-stage, separated gas/fluid shock strut. The calculating, by the controller, the volume of oil may comprises: calculating, by the controller, a first oil volume estimate using the secondary chamber nominal pressure and the shock strut stroke associated with the secondary chamber nominal pressure; calculating, by the controller, a second secondary chamber nominal pressure; determining, by the controller, a second shock strut stroke associated with the second secondary chamber nominal pressure; and calculating, by the controller, a second oil volume estimate using the second secondary chamber nominal pressure and the second shock strut stroke associated with the secondary chamber nominal pressure. The calculating, by the controller, the volume of oil may comprise calculating, by the controller, an error between the first oil volume estimate and the second oil volume estimate, and determining, by the controller, if the error is less than or equal to a threshold value. The controller may determine the volume of oil in the oil chamber to be the first oil volume estimate in response to the error being less than or equal to the threshold value. The instructions may cause the controller to perform further operations comprising at least one of: comparing, by the controller, the volume of oil in the oil chamber with a plurality of threshold values; comparing, by the controller, the number of moles of gas in the primary chamber with a plurality of threshold values; comparing, by the controller, the number of moles of gas in the secondary chamber with a plurality of threshold values; and comparing, by the controller, the volume of oil leaked into the primary chamber with a plurality of threshold values. The instructions may cause the controller to perform further operations comprising issuing, by the controller, a servicing message, in response to the comparing. The secondary chamber nominal pressure may be adjusted according to the primary chamber temperature sensor reading. The controller may be in electronic communication with a pressure/temperature sensor for the primary chamber. The instructions may cause the controller to perform further operations comprising adjusting the volume of oil in the oil chamber to a reference temperature. The instructions may cause the controller to perform further operations comprising calculating, by the controller, a deviation of the volume of oil in the primary chamber from a nominal oil volume level for the oil chamber.

A dual-stage, separated gas/fluid shock strut arrangement is disclosed herein, in accordance with various embodiments. The dual-stage, separated gas/fluid shock strut arrangement may comprise the dual-stage, separated gas/ fluid shock strut, a pressure/temperature sensor mounted to the primary gas chamber, a stroke sensor mounted to the dual-stage, separated gas/fluid shock strut, and a monitoring system. The dual-stage, separated gas/fluid shock strut may comprise a strut cylinder, a strut piston operatively coupled to the strut cylinder, an oil chamber, a primary gas chamber, and a secondary gas chamber. The monitoring system may comprise a recorder configured to receive a plurality of sensor readings from at least one of the pressure/temperature sensor and the stroke sensor, a landing detector configured to detect a landing event based upon a stroke sensor reading received from the stroke sensor, and a health monitor configured to determine a volume of oil in the oil chamber, a volume of gas in the primary gas chamber, and a volume of gas in the secondary gas chamber.

In various embodiments, the monitoring system may further comprise a take-off detector configured to detect a take-off event based upon the stroke sensor reading received from the stroke sensor, wherein the plurality of sensor readings are recorded after a take-off event. The primary gas chamber may be separated from the oil chamber by a first separator piston and the secondary gas chamber is separated from the oil chamber by a second separator piston. The monitoring system may further comprise a counter configured to prevent at least one of the landing detector and the take-off detector from receiving data from the recorder for a predetermined duration, and a data logger configured to receive data from the health monitor. The health monitor may calculate a secondary chamber nominal pressure, determine a shock strut stroke associated with the secondary chamber nominal pressure, and calculate the volume of oil in the oil chamber.

A method for monitoring a dual-stage, separated gas/fluid shock strut is disclosed herein, in accordance with various embodiments. The method may comprise receiving, by a controller, a primary chamber temperature sensor reading; receiving, by the controller, a primary chamber pressure sensor reading; receiving, by the controller, a shock strut stroke sensor reading; calculating, by the controller, a secondary chamber nominal pressure based upon the primary chamber temperature sensor reading; determining, by the controller, a shock strut stroke associated with the secondary chamber nominal pressure; calculating, by the controller, a volume of oil in an oil chamber of the dual-stage, separated gas/fluid shock strut; calculating, by the controller, a volume of gas in a primary gas chamber of the dual-stage, separated gas/fluid shock strut based upon at least the volume of oil; calculating, by the controller, a number of moles of gas in the primary gas chamber of the dual-stage, separated gas/fluid shock strut; calculating, by the controller, a volume of oil leaked into the primary gas chamber of the dual-stage, separated gas/fluid shock strut; calculating, by the controller, a volume of gas in a secondary chamber of the dual-stage, separated gas/fluid shock strut; and calculating, by the controller, a number of moles of gas in the secondary chamber.

In various embodiments, the calculating, by the controller, the volume of oil in the oil chamber may comprise: calculating, by the controller, a first oil volume estimate using the secondary chamber nominal pressure and the shock strut stroke associated with the secondary chamber nominal pressure; calculating, by the controller, a second secondary chamber nominal pressure; determining, by the controller, a second shock strut stroke associated with the second secondary chamber nominal pressure; calculating, by the controller, a second oil volume estimate using the second secondary chamber nominal pressure and the second shock strut stroke associated with the secondary chamber nominal pressure; and issuing, by the controller, a servicing message to a visual display.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
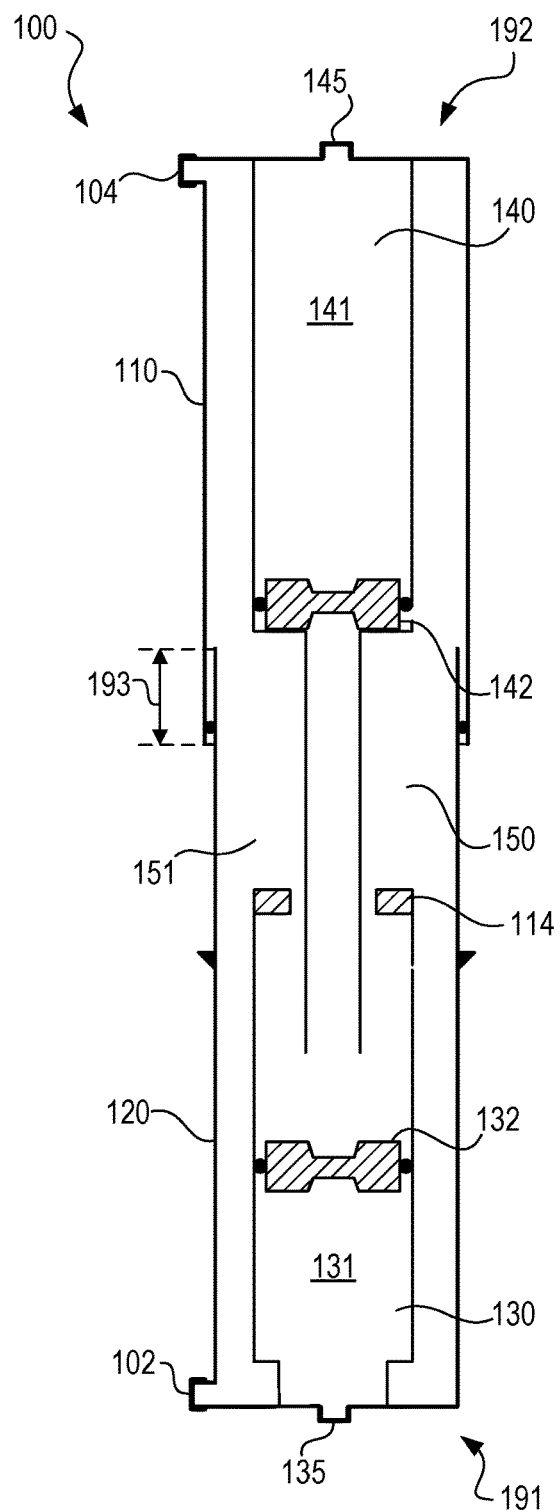
FIG. 1 illustrates a schematic view of a dual-stage, separated gas/fluid shock strut at a stroke of zero (0) (i.e., maximum extension), in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

A shock strut gas pressure and stroke in static condition may be measured and any deviation from the shock strut theoretical static airspring curve typically may be compensated by re-servicing the shock strut with gas. Such an approach may be taken to reduce maintenance time associated with just adding gas to the shock strut. However, said approach assumes the deviation from static airspring curve is solely due to gas loss and therefore could overlook an oil leak in the system.

Aircraft landing gear systems in accordance with the present disclosure may comprise a shock strut. A shock strut may comprise various fluids such as oil and gas. Performance of the shock strut may be evaluated by monitoring aspects of the shock strut, including primary chamber gas temperature, primary chamber gas pressure, and shock strut stroke of the shock strut at various points during operation of the aircraft. Stroke may refer to a shock strut piston position relative to a shock strut cylinder.

A monitoring system, as provided herein, may comprise an integrated pressure/temperature sensor installed on the primary gas chamber of a dual-stage, separated gas/fluid shock strut, a stroke sensor that directly or indirectly measures the shock strut stroke, and an electronic control unit that executes a monitoring algorithm. The monitoring algorithm may use transient gas pressure and gas temperature during landing or take-off and quantifies the oil and gas levels in the shock strut. Moreover, the monitoring system may estimate oil leakage into the gas chambers. The monitoring algorithm may issue a servicing message based on the shock strut estimated fluid and gas levels.

Because oil and gas levels may be determined independently, said levels can be used for diagnostic and prognostic purposes. The rate of oil or gas loss may be used to schedule future servicing.

The following nomenclature in table 1 and table 2 corresponds to various equations and parameters described in the present disclosure:

TABLE 1

| Measurements | |
|---|---|
| Measurements | |
| $\hat{P}_{primary}$ | Primary chamber gas pressure sensor reading |
| $\hat{T}_{primary}$ | Primary chamber gas temperature sensor reading |
| $\hat{S}$ | Shock strut stroke sensor reading |
| $\hat{P}_{primary}(0)$ | Primary chamber pressure sensor reading at a shock strut stroke of 0 (or near 0) (e.g., 25% of maximum stroke or less) |
| $\hat{T}_{primary}(0)$ | Primary chamber temperature sensor reading at a shock strut stroke of 0 (or near 0) (e.g., 25% of maximum stroke or less) |
| $\hat{P}_{primary}(S)$ | Primary chamber pressure sensor reading at a shock strut stroke of S |
| $\hat{P}_{primary}(\hat{S}_{activation})$ | Primary chamber pressure sensor reading at the secondary chamber activation stroke |
| $\hat{P}_{primary,max}$ | Maximum primary chamber pressure during landing |
| $\hat{S}_{primary,max}$ | Shock strut stoke at which primary chamber reaches its maximum level |

TABLE 2

| Algorithm Internal Parameters | |
|---|---|
| Algorithm Internal Parameters | |
| $A_p$ | Shock strut piston area |
| $S_{activation\_nom}$ | Estimated activation stroke of the secondary chamber |
| $\overline{V}_{oil}$ | Optimization algorithm guess for oil volume |
| $V_{oil}(0)$ | Estimated oil volume at a shock strut stroke of 0 (or near 0) (e.g., 25% of maximum stroke or less) |
| $\overline{P}_{primary}(S_{activation\_nom})$ | Calculated Primary chamber pressure at the secondary chamber activation stroke |
| $V_{tot}$ | Total internal volume of the shock strut in the fully extended position |
| $V_{secondary\_chamber\_nom}$ | Secondary chamber nominal internal volume at the shock strut stroke of 0 |
| $V_{primary\_chamber}(0)$ | Estimated primary chamber internal volume at the shock strut stroke of 0 (or near 0) (e.g., 25% of maximum stroke or less) |
| Z | Nitrogen compressibility factor |
| R | Ideal gas constant |
| β | Oil bulk modulus |
| $V_{oil}(\hat{S}_{primary,max})$ | Oil volume at the shock strut stroke of $\hat{S}_{primary,max}$ |
| $V_{primary+secondary}(\hat{S}_{primary,max})$ | Total volume of primary and secondary chambers at the shock strut stroke of $\hat{S}_{primary,max}$ |

TABLE 2-continued

| Algorithm Internal Parameters | |
|---|---|
| Algorithm Internal Parameters | |
| $\Delta \overline{V}_{primary\_chamber}$ | Optimization algorithm guess for primary chamber displacement volume |
| $\overline{P}_{primary,max}$ | Calculated primary chamber pressure at the shock strut stroke of $\hat{S}_{primary,max}$ |
| $\overline{V}_{primary\_chamber}(\hat{S}_{primary,max})$ | Calculated primary chamber volume at the shock strut stroke of $\hat{S}_{primary,max}$ |
| $V_{primary\_chamber\_dead}$ | Primary chamber nominal dead volume |
| $V_{primary\_chamber\_leakage}$ | Calculated oil leakage volume into the primary chamber |
| $\overline{V}_{secondary\_chamber}(\hat{S}_{primary,max})$ | Calculated secondary chamber volume at the shock strut stroke of $\hat{S}_{primary,max}$ |
| $\Delta \overline{V}_{secondary\_chamber}$ | Calculated secondary chamber displacement volume |
| $\overline{P}_{secondary@\hat{S}primary,max}$ | Estimated secondary chamber pressure at the shock strut stroke of $\hat{S}_{primary,max}$ |
| $n_{primary\_chamber}$ | Primary chamber calculated number of moles of gas |
| $n_{secondary\_chamber}$ | Secondary chamber calculated number of moles of gas |
| $T_{ref}$ | Reference temperature |
| dT | Numerical integration step |
| α | Oil thermal expansion coefficient |
| $V_{oil\ nom}$ | Nominal oil volume |
| $V_{oil@Tref}$ | Oil volume at $T_{ref}$ |
| $V_{threshold}$ | Oil volume threshold |
| $P_{primary\_nom}$ | Primary chamber nominal pressure |
| $V_{primary\_chamber\_0}$ | Primary chamber nominal volume |
| $n_{primary\_chamber\_nominal}$ | Primary chamber nominal number of moles |
| $n_{primary,threshold}$ | Primary chamber threshold |
| $P_{secondary\_nom}$ | Secondary chamber nominal pressure |
| $P_{secondary\_nom\_adj}$ | Secondary chamber nominal pressure adjusted for temperature |
| $V_{secondary\_chamber\_0}$ | Secondary chamber nominal volume |
| $n_{secondary\_chamber\_nominal}$ | Secondary chamber nominal number of moles |
| $n_{secondary,threshold}$ | Secondary chamber threshold |
| $\{V_{oil}(0)\}$ | Estimation for oil volume |
| $S_{activation-\Delta P}$ | Shock strut stroke at $P_{secondary\_estimated} - \Delta P$ |
| $\Delta P$ | Pressure step on the pressure/stroke curve |
| $\hat{P}_{primary}(S_{activation-\Delta P})$ | Primary chamber pressure at $S_{activation-\Delta P}$ |
| error_$i^{th}$ | Percentage of error between $i^{th}$ and $(i-1)^{th}$ estimation for oil volume |

In various embodiments, a monitoring system for a dual-stage, separated gas/fluid shock strut is provided herein. A functional schematic view of such a shock strut is presented in FIG. 1.

With reference to FIG. 1, a dual-stage, separated gas/fluid shock strut (shock strut) 100 is illustrated, in accordance with various embodiments. Shock strut 100 may comprise a strut cylinder 110 and a strut piston 120. Strut piston 120 may be operatively coupled to strut cylinder 110 as described herein. Strut cylinder 110 may be configured to receive strut piston 120 in a manner that allows the two components to telescope together and absorb and dampen forces transmitted thereto. In various embodiments, a liquid, such as a hydraulic fluid and/or oil may be located within strut cylinder 110. Further, a gas, such as nitrogen or air, may be located within strut cylinder 110. Strut cylinder 110 and strut piston 120 may, for example, be configured to seal such that fluid contained within strut cylinder 110 is prevented from leaking as strut piston 120 translates relative to strut cylinder 110.

Shock strut 100 may consist of a low pressure, primary gas chamber 130 in which gas is contained. In this regard, a volume of gas (also referred to herein as a primary chamber gas volume) 131 may be contained within primary gas chamber 130. Shock strut 100 may further consist of a high pressure, secondary gas chamber 140. In this regard, a volume of gas 141 (also referred to herein as a secondary chamber gas volume) may be contained within secondary gas chamber 140. The volume of gas 131 may be at a lower pressure than the volume of gas 141 when shock strut 100 is in the fully extended position (i.e., at a shock strut stroke of zero). Primary gas chamber 130 may be located at a first end 191 of shock strut 100. First end 191 may be the bottom of shock strut 100. Secondary gas chamber 140 may be located at a second end 192 of shock strut 100. Second end 192 may be the top of shock strut 100.

Shock strut 100 may further consist of an oil chamber 150. In this regard, a volume of oil (also referred to herein as an oil chamber oil volume) 151 may be contained within oil chamber 150. Primary gas chamber 130 may be separated from oil chamber 150 via a separator piston (also referred to herein as a first separator piston) 132. Secondary gas chamber 140 may be separated from oil chamber 150 via a separator piston (also referred to herein as a second separator piston) 142. Separator piston 142 may translate within secondary gas chamber 140. FIG. 1 illustrates separator piston 142 at a minimum compression stroke (also referred to as being "bottomed out"). Stated differently, with shock strut 100 in the fully extended position, separator piston 142 may be located in a position such that the volume of secondary gas chamber 140 is at its maximum value. When separator piston 142 is bottomed out, it may be mechanically prevented from translating towards first end 191.

Shock strut 100 may further consist of an orifice plate 114. Orifice plate 114 may be located in oil chamber 150. Shock strut 100 may comprise an oil charge port 102 in fluid communication with oil chamber 150. Shock strut 100 may comprise an oil bleed port 104 in fluid communication with oil chamber 150. Shock strut 100 may comprise a primary chamber gas charge port 135 in fluid communication with primary gas chamber 130. Shock strut 100 may comprise a secondary chamber gas charge port 145 in fluid communication with secondary gas chamber 140.

Figure 2:
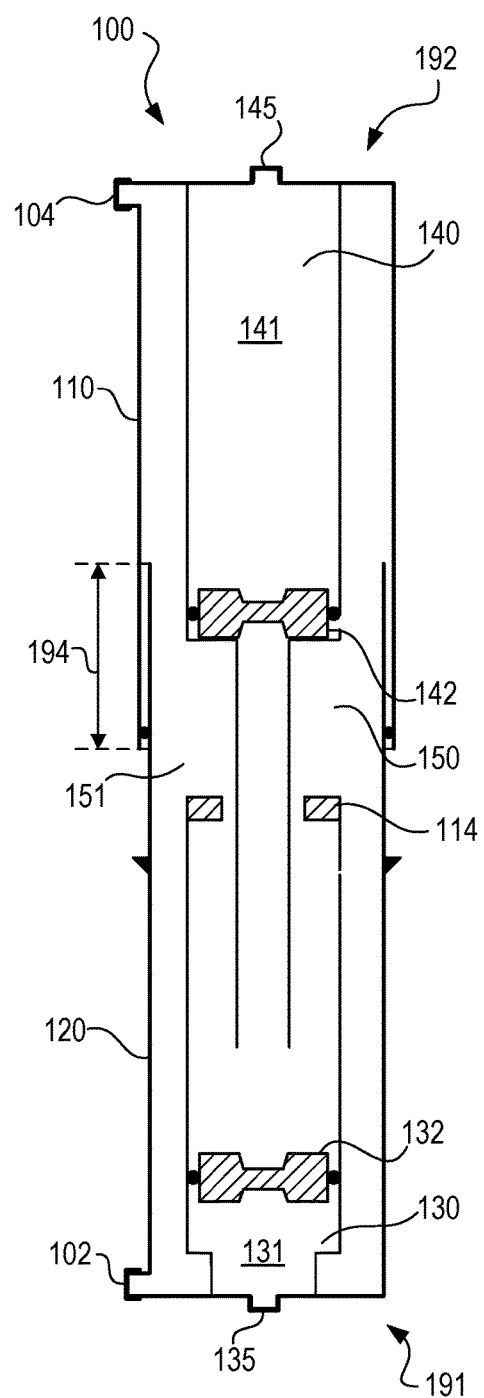
FIG. 2 illustrates a schematic view of the dual-stage, separated gas/fluid shock strut of FIG. 1 at a secondary gas chamber activation stroke ($S_{activation}$), in accordance with various embodiments.
Figure 3:
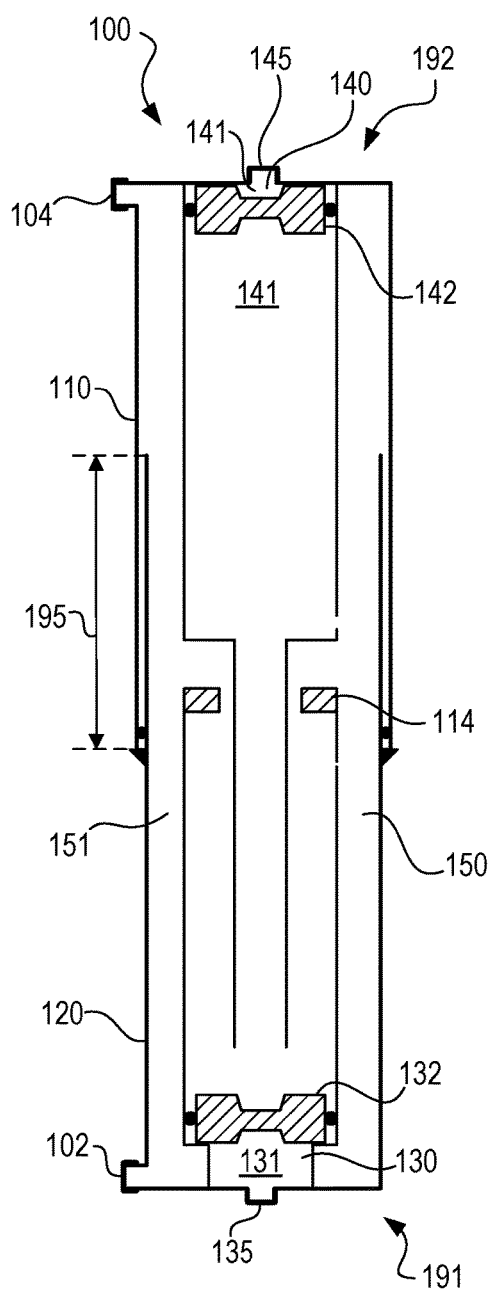
FIG. 3 illustrates a schematic view of the dual-stage, separated gas/fluid shock strut of FIG. 1 at a maximum stroke ($S_{max}$), in accordance with various embodiments.

In various embodiments, shock strut 100 may be installed onto a landing gear of an aircraft. During a landing event, shock strut 100 may be compressed wherein strut piston 120 translates into strut cylinder 110. During the landing, the shock strut may initially function as a single-stage, separated gas/fluid shock strut by metering oil through orifice plate 114 and compressing the volume of gas 131 in primary gas chamber 130. The compression of primary gas chamber 130 may continue until the pressure in primary gas chamber 130 is equal to or greater than the pressure of the volume of gas 141 within secondary gas chamber 140. As illustrated in FIG. 2, this occurs at a shock strut stroke 194, (i.e., $S_{activation}$) of between zero and the maximum shock strut stroke, $S_{max}$. Separator piston 132 may translate towards first end 191 as shock strut 100 is compressed. Once the secondary gas chamber 140 is activated, further compression of the shock strut may compress the volume of gas 141 in the secondary gas chamber 140, as illustrated in FIG. 3. FIG. 3 illustrates shock strut 100 in a fully compressed position, or at a maximum shock strut stroke 195 (i.e., $S_{max}$).

Figure 4A:
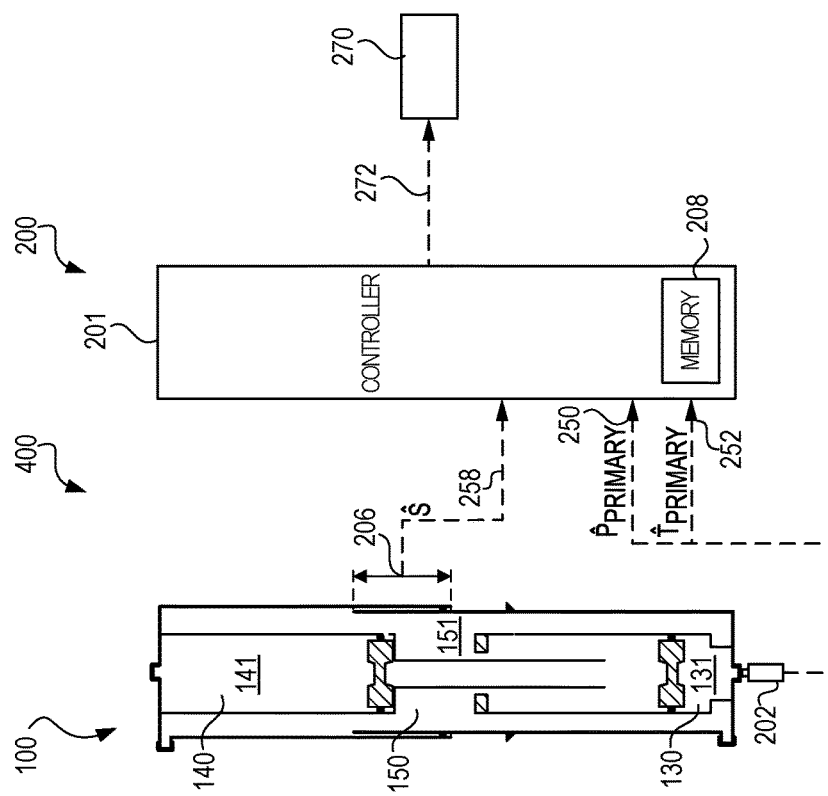
FIG. 4A illustrates a schematic view of a dual-stage, separated gas/fluid shock strut arrangement comprising the dual-stage, separated gas/fluid shock strut of FIG. 2 and a monitoring system, in accordance with various embodiments.
Figure 4B:
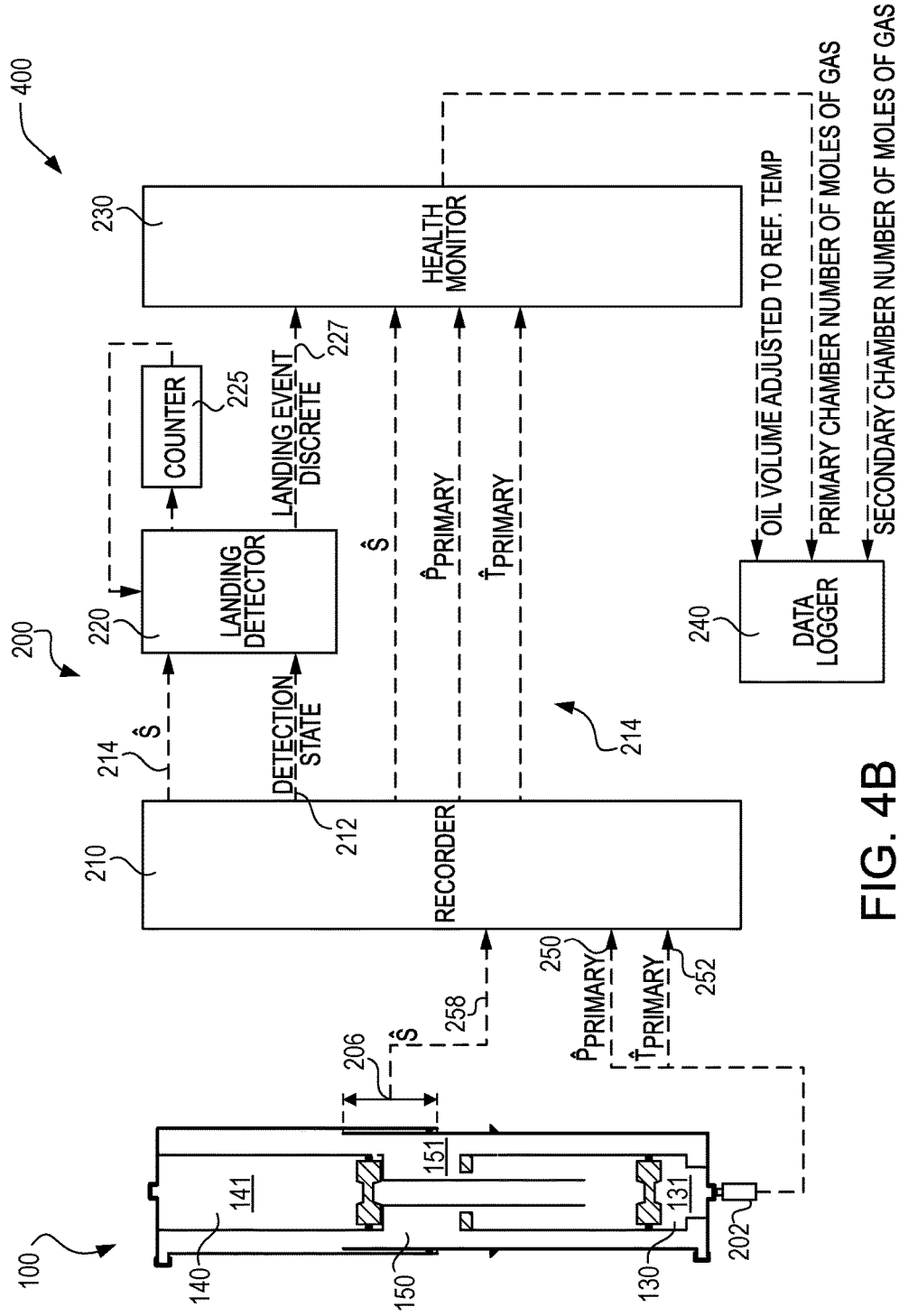
FIG. 4B illustrates a schematic view of the dual-stage, separated gas/fluid shock strut arrangement of FIG. 4A, with a more detailed view of the monitoring system, in accordance with various embodiments.

With reference to FIG. 4A and FIG. 4B, a dual-stage, separated gas/fluid shock strut arrangement (shock strut arrangement) 400 is illustrated, in accordance with various embodiments. Shock strut arrangement 400 may include shock strut 100 and a monitoring system 200. Monitoring system 200 may comprise various sensing elements. Monitoring system 200 may comprise an integrated pressure/temperature sensor 202 installed on the primary gas chamber 130 to measure gas pressure and temperature within primary gas chamber 130. Although described herein as an integrated pressure/temperature sensor 202, it is contemplated herein that a separate pressure sensor and temperature sensor may be used in place of integrated pressure/temperature sensor In this regard, the term "pressure/temperature sensor" as used herein, may refer to either an integrated pressure/temperature sensor or to separate pressure and temperature sensors. Monitoring system 200 may comprise a position sensor (also referred to herein as a stroke sensor) 206 configured to directly or indirectly measure the shock strut stroke 258 ($\hat{S}$). In this regard, the sensors may measure various parameters and provide measurements to a monitoring algorithm.

Integrated pressure/temperature sensor 202 may measure primary chamber gas pressure 250 ($\hat{P}_{primary}$), and primary chamber gas temperature 252 ($\hat{T}_{primary}$). Stroke sensor 206 may measure shock strut stroke 258 ($\hat{S}$). Primary chamber gas pressure, $\hat{P}_{primary}$, primary chamber gas temperature, $\hat{T}_{primary}$, and shock strut stroke, $\hat{S}$ may be referred to herein as sensor readings (e.g., primary chamber gas pressure sensor reading).

Monitoring system 200 may be devised assuming that the sensors comprise a minimum sampling frequency of between 10 Hz and 1000 Hz in accordance with various embodiments, of between 60 Hz and 200 Hz in accordance with various embodiments, or about 100 Hz in accordance with various embodiments, wherein the term "about" in this regard may mean±20 Hz.

With reference to FIG. 4A, monitoring system 200 may comprise a controller 201 and a tangible, non-transitory memory 208 configured to communicate with the controller 201. The tangible, non-transitory memory 208 may have instructions stored thereon that, in response to execution by the controller 201, cause the controller 201 to perform various operations as described herein. Monitoring system 200 may comprise a visual display 270. Visual display 270 may be in electronic communication with controller 201. As described herein, controller 201 may issue or send a servicing message 272. Servicing message 272 may be displayed on visual display 270. In various embodiments, servicing message 272 may comprise an indication of a quantity of oil or gas in shock strut 100. In various embodiments, servicing message 272 may comprise a current and/or a voltage signal. Controller 201 may be in electronic communication with integrated pressure/temperature sensor 202. FIG. 4B illustrates monitoring system 200 in further detail.

In various embodiments, with reference to FIG. 4B, monitoring system 200 may comprise a recorder 210, a landing detector 220, a counter 225, a health monitor 230, and/or a data logger 240. Recorder 210, landing detector 220, counter 225, health monitor 230, and/or data logger 240 may comprise instructions stored in a tangible, non-transitory memory 208 (see FIG. 4A). Recorder 210, landing detector 220, counter 225, health monitor 230, and/or data logger 240 may be implemented on one or more controllers (e.g., controller 201 of FIG. 4A). In this regard, controller 201 (see FIG. 4A) may comprise one or more controllers. For example, a first controller (e.g., recorder 210) may receive sensor information and a second controller (e.g., health monitor 230) may perform the calculations as described herein.

In various embodiments, recorder 210 may receive primary chamber gas pressure 250 ($\hat{P}_{primary}$), primary chamber gas temperature 252 ($\hat{T}_{primary}$), and shock strut stroke 258 ($\hat{S}$), and record them in an array that keeps the readings for a pre-determined length of time, such as 15 seconds for example. A new set of recordings may be added to the top of the array and the oldest set of data may be eliminated from the bottom of the array to keep the length of the array constant. At any instant, recorder 210 may export the array which comprises the latest set of data recorded over the pre-determined length of time to the landing detector 220. Recorder 210 may receive the sensor readings in real-time or at a later time.

At the startup when the length of the data array 214 is not equivalent to 15 seconds (tunable parameter), recorder 210 may send a false detection state signal 212 to landing detector 220 to prevent landing detector 220 from using the incomplete array. Once 15 seconds (tunable parameter) of measurement is available, the detection state signal 212 may turn true to allow landing detector 220 to use the measurements.

In various embodiments, landing detector 220 may receive the array of data 214 and check the array against the following set of criteria: first, that the minimum stroke in the array is smaller than a minimum dimension, such as 0.2" (tunable parameter), second, that the maximum stroke in the array is bigger than a maximum dimension, such as 5" (tunable parameter), third, that the stroke for the first five (5) seconds of the array is less than the minimum dimension, and fourth, that the maximum stroke in the first ten (10) seconds (tunable parameter) of the array is bigger than a threshold dimension, such as 4" (tunable parameter).

The first two criteria may ensure that the set of data is associated to a landing or a take-off or any other event that has caused the shock strut to travel between 0.2" to 5" (tunable parameters). The third criterion may ensure that the set of data is associated to a landing as in the first five (5)

seconds the shock strut has been fully extended. The fourth criterion may ensure that the selected set of data also includes 5 seconds of measurement after compression. It is contemplated herein that the algorithm parameters may be tuned according to various embodiments, for example may be tuned up further. If the data array 214 meets all these criteria, it is categorized as a landing event and exported to health monitor 230. A signal 227 may also be sent to the health monitor 230 indicating that the data array 214 meets all of the above criteria. A counter 225 may also be started to prevent landing detector 220 from receiving any new array of measurements for a predetermined duration, such as five (5) minutes (tunable parameter). This may relax the need for a high speed processor for health monitoring purposes. If the data array 214 does not meet all the criteria, landing detector 220 may disregard the array and wait for the new array of data.

In various embodiments, health monitor 230 may receive the array of data 214 that includes various sensor measurements. In various embodiments, the sensor measurements may include primary chamber gas pressure 250 ($\hat{P}_{primary}$), primary chamber gas temperature 252 ($\hat{T}_{primary}$), and/or shock strut stroke 258 ($\hat{S}$). The array of data 214 may be received by health monitor 230 for a pre-determined length of time, such as 15 seconds, for example.

Figure 4C:
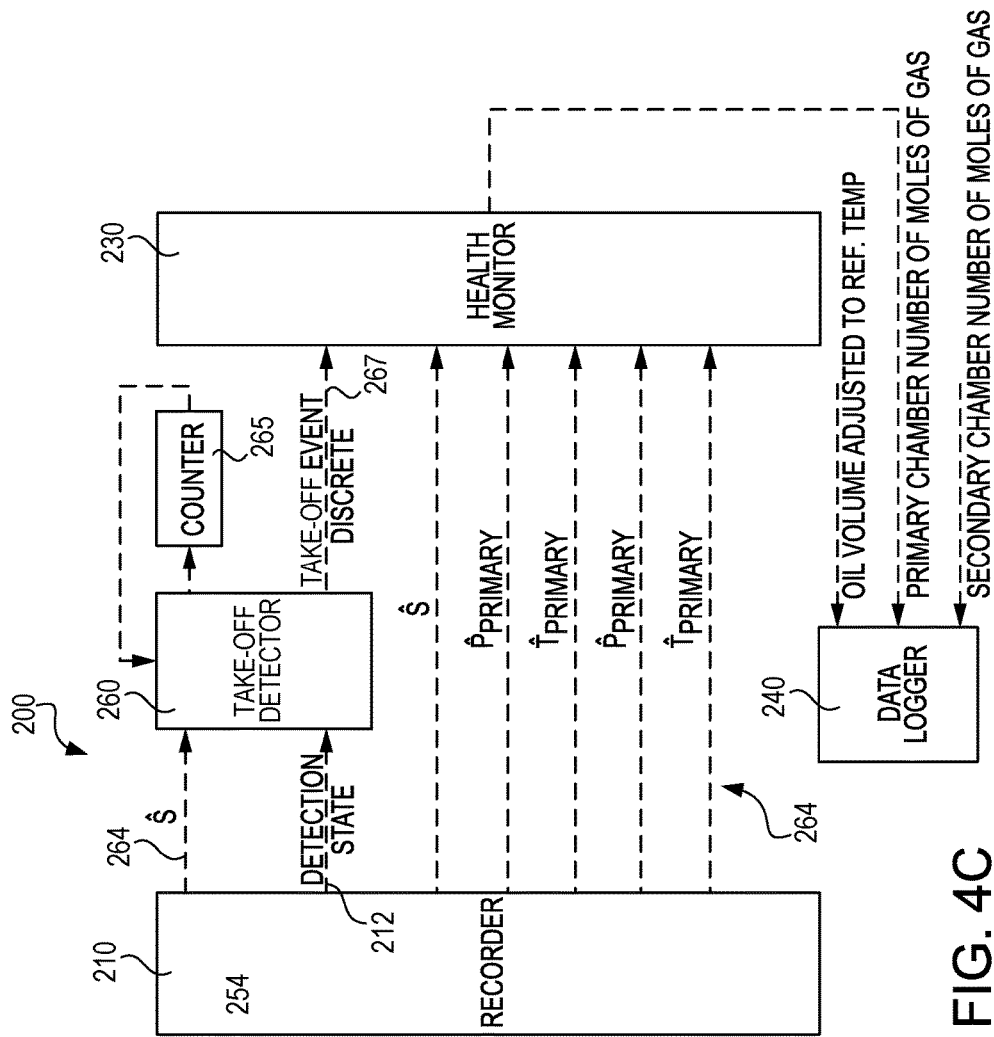
FIG. 4C illustrates a schematic view of a portion of the monitoring system of FIG. 4B with a take-off detector, in accordance with various embodiments.

With reference to FIG. 4C, a portion of monitoring system 200 is illustrated with a take-off detector 260. In this regard, in addition to landing detector 220, monitoring system 200 may further comprise take-off detector 260. It may be desirable to ensure that sensor readings are available when shock strut 100 is in the fully extended position, as illustrated in FIG. 1. Thus, take-off detector 260 may be provided to detect a take-off event. After take-off, shock strut 100 may be in a fully extended position. In this regard, sensor readings taken after take-off may comprise values corresponding to a shock strut stroke of zero (0). In this regard, monitoring system 200 may use sensor readings from data array 264 for calculations which use data corresponding to a shock strut stroke of zero (0), as described herein.

Take-off detector 260 may operate similar to landing detector 220, but using different criteria to examine stroke sensor readings to determine the take-off event. A data array 264 may be sent from recorder 210 to take-off detector 260. Similarly, data array 264 may be sent to health monitor 230. Data array 264 may be similar to data array 214 as described in FIG. 4B. In this regard, at the startup when the length of the data array 264 is not equivalent to a predetermined duration, such as 15 seconds for example, recorder 210 may send a false detection state signal 212 to take-off detector 260 to prevent take-off detector 260 from using the incomplete array. Once the predetermined duration of measurement is available, the detection state signal 212 may turn true to allow take-off detector 260 to use the measurements in the data array 264.

In various embodiments, take-off detector 260 may receive the array of data 264 and check the array against the following set of criteria: first, that the minimum stroke in the array is less than a minimum dimension (i.e., $S_{min,takeoff}$), such as 0.2" (tunable parameter), second, that the maximum stroke in the array is greater than a maximum dimension (i.e., $S_{max,takeoff}$), such as 5" (tunable parameter), third, that the stroke for the first five (5) seconds of the array is greater than the maximum dimension (i.e., $S_{max,takeoff}$), and fourth, that the minimum stroke in the first ten (10) seconds (tunable parameter) of the array is less than the minimum dimension (i.e., $S_{min,takeoff}$).

The first two criteria may ensure that the set of data is associated to a landing or a take-off or any other event that has caused the shock strut to travel between 0.2" to 5" (tunable parameters). The third criterion may ensure that the set of data is associated to a take-off because in the first five (5) seconds of data the shock strut is compressed to a shock strut stroke greater than $S_{max,takeoff}$. The fourth criterion may ensure that the selected set of data also includes 5 seconds of measurement after take-off. It is contemplated herein that the algorithm parameters may be tuned according to various embodiments. If the data array 264 meets all these criteria, it is categorized as a take-off event and exported to health monitor 230. A signal 267 may also be sent to the health monitor 230 indicating that the data array 264 meets all of the above criteria. A counter 265 may also be started to prevent take-off detector 260 from receiving any new array of measurements for a predetermined duration, such as five (5) minutes (tunable parameter). This may relax the need for a high speed processor for health monitoring purposes. If the data array 264 does not meet all the criteria, take-off detector 260 may disregard the array and wait for the new array of data.

Oil Volume Determination:

In various embodiments, the oil volume 133 may be determined via health monitor 230. With combined reference to FIG. 4B and FIG. 5A, at the onset of compression of the shock strut 100, the pressure within primary gas chamber 130 is less than the pressure within secondary gas chamber 140. As compression continues, the primary chamber gas pressure increases and may exceed the secondary chamber gas pressure. Once the primary chamber gas pressure exceeds the secondary chamber gas pressure, the secondary gas chamber 140 may be activated and further compression of shock strut 100 may cause compression of both primary gas chamber 130 and secondary gas chamber 140. Monitoring system 200 may utilize the measured dynamic airspring curve 502 of the primary gas chamber 130, before secondary chamber activation, to determine volume of oil 151 in oil chamber 150. In the first stage of compression, the shock strut functions as a single-stage, separated gas/fluid shock strut with a known initial internal volume and the slope of airspring curve 502 depends solely on the volume of oil in oil chamber 150. However, because the pressure of the secondary gas chamber 140 may not be measured, the portion of the airspring that corresponds to the first phase of compression may not be directly established. The shock strut stroke at which the secondary gas chamber 140 is activated is directly dependent upon the pressure of the secondary gas chamber 140 which is not measured and remains unknown to the algorithm. In this regard, when the secondary gas chamber 140 is activated, the slope of the airspring curve 502 versus shock strut stroke may decrease. Thus, the algorithm may indirectly determine the portion of the airspring that corresponds to the initial phase of compression by monitoring the slope of the airspring curve 502 versus shock strut stroke.

In various embodiments, monitoring system 200 may calculate a secondary chamber nominal pressure of secondary gas chamber 140, adjusted for temperature, as follows:

$$P_{secondary\_nom\_adj} = \frac{P_{secondary\_nom}}{T_{ref}} \times \hat{T}_{primary}(0) \qquad \text{Eq. (1)}$$

Figure 5A:
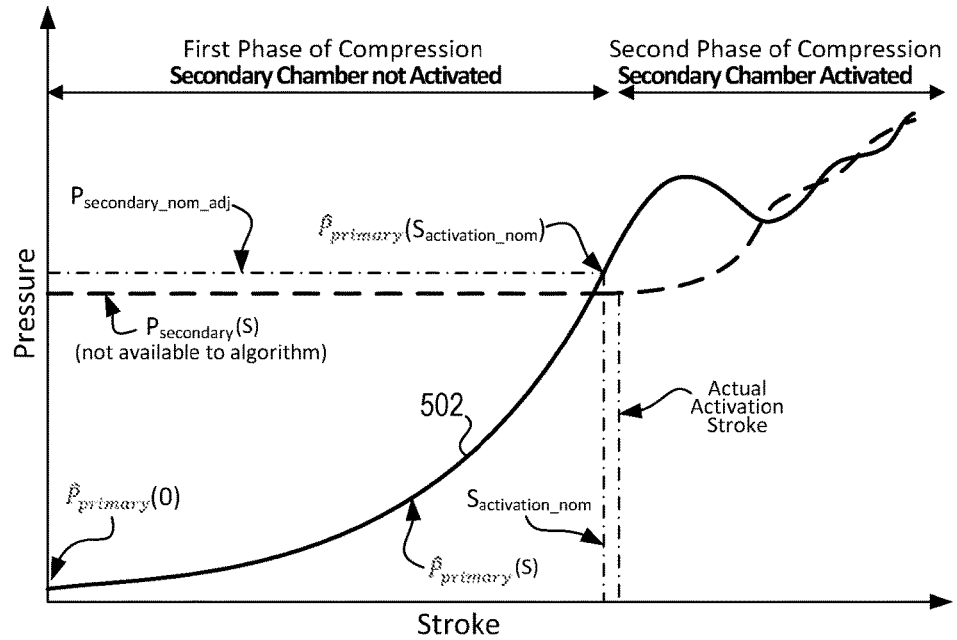
FIG. 5A illustrates a dynamic airspring curves of a primary gas chamber, in accordance with various embodiments.

Then, monitoring system 200 may determine the shock strut stroke (i.e., $S_{activation\_nom}$) associated with the pressure (i.e., $P_{secondary\_nom\_adj}$) of the secondary gas chamber 140 using airspring curve 502. It is noteworthy that the estimated activation stroke (i.e., $S_{activation\_nom}$) is just a starting point for the algorithm. The real activation stroke may be different from this estimated value, as shown in FIG. 5A. The actual activation stroke may be the stroke at which the pressure of secondary gas chamber 140 starts to change.

If the pressure in primary gas chamber 130 remains below $P_{secondary\_nom\_adj}$ during a landing event and $S_{activation\_nom}$ cannot be defined, it may be determined that either the compressions rate is not high enough or that the secondary gas chamber 140 has endured a significant loss of pressure. In this case, monitoring system 200 may stop and a servicing message may be logged in data logger 240.

Once the nominal pressure of secondary gas chamber 140 is determined, the primary chamber inflation pressure in the fully extended position (i.e., $\hat{P}_{primary}(0)$) or near the fully extended position, the primary chamber temperature in the fully extended position (i.e., $\hat{T}_{primary}(0)$) or near the fully extended position, nominal pressure of secondary gas chamber 140, adjusted for temperature (i.e., $\hat{P}_{primary}(S_{activation\_nom})=P_{secondary\_nom\_adj}$), and the shock strut stroke at $P_{secondary\_nom}$ (i.e., $S_{activation\_nom}$) may be stored for use by monitoring system 200 to determine the volume of oil 151.

Figure 6:
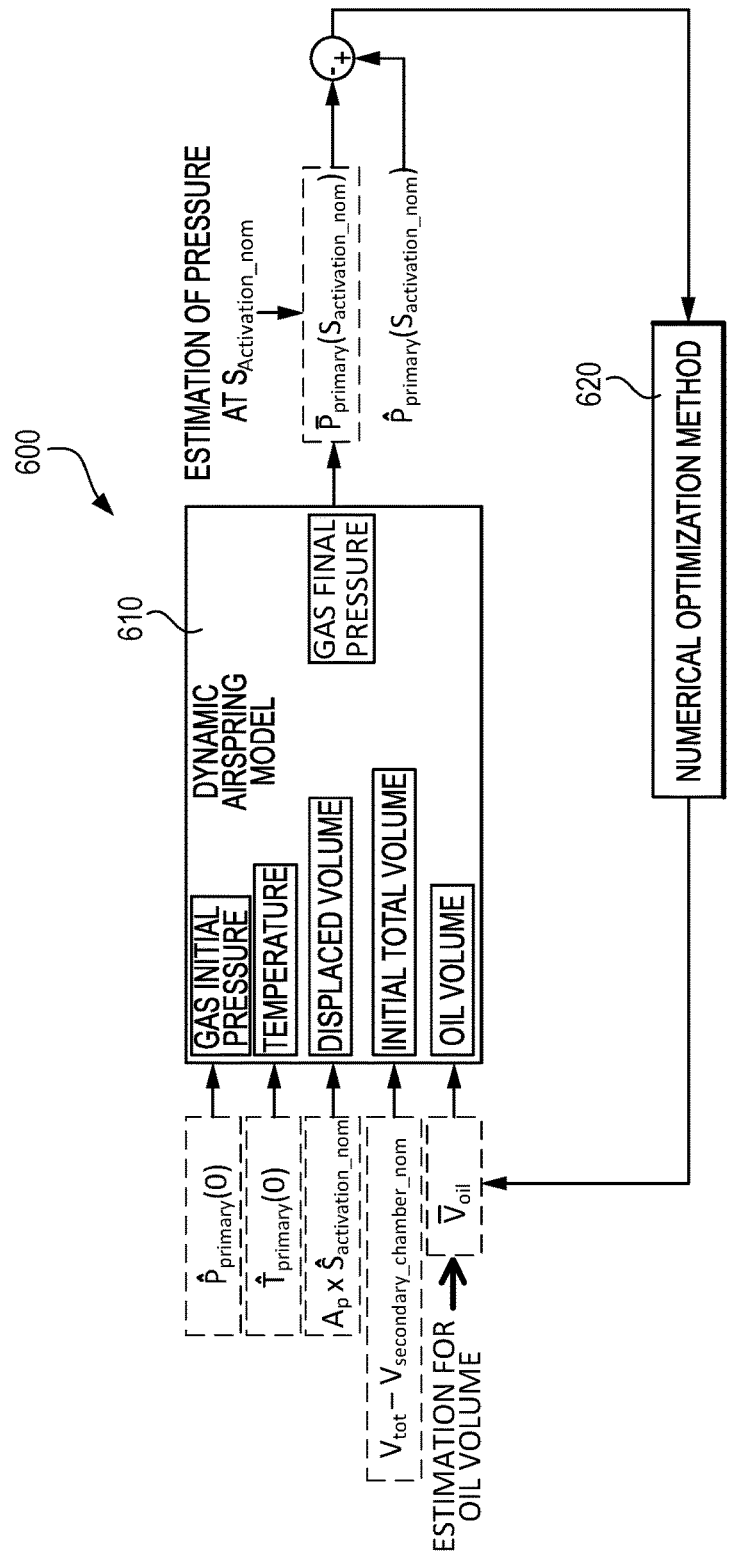
FIG. 6 illustrates an algorithm for estimating a volume of oil in an oil chamber of a shock strut, in accordance with various embodiments.

With combined reference to FIG. 4B and FIG. 6, monitoring system 200 may use a dynamic airspring model 610, along with a numerical optimization method 620 to estimate the volume of the oil 151 in oil chamber 150. In this regard, FIG. 6 illustrates an algorithm 600 for estimating the volume of oil 151 in oil chamber 150. Dynamic airspring model 610 may generate an accurate estimation of transient gas pressure for a single-stage, separated gas/fluid shock strut for a displacement volume, if oil volume, initial temperature, initial gas pressure, and initial total internal volume are known. However, since the oil volume is required for the model to work, the algorithm 600 provides an initial estimate for the oil volume (i.e., $\hat{V}_{oil}$), computes the pressure at $S_{activation\_nom}$, and then compares said pressure with the measured pressure at $S_{activation\_nom}$. Stated differently, health monitor 230 may use the primary chamber inflation pressure in the fully extended position (i.e., $\hat{P}_{primary}(0)$), the primary chamber temperature in the fully extended position (i.e., $\hat{T}_{primary}(0)$), the displacement volume of the primary gas chamber 130 at $S_{activation}$ (i.e., $S_{activation\_nom}*A_p$), the total volume of the primary gas chamber 130 and the oil chamber 150 (i.e., $V_{tot}-V_{secondary\_chamber\_nom}$), and an initial estimate for the volume of the oil in oil chamber 150 (i.e., $\hat{V}_{oil}$), for example 10 cubic inches (163.87 cm³), and may compute the primary chamber gas pressure at $S_{activation\_nom}$.

A gradient free, single-variable, numerical optimization technique, such as Bisection or Line Search methods may be used to adjust the initial estimate for the oil volume so that the difference between the measured primary gas chamber pressure at $S_{activation\_nom}$ (i.e., $\hat{P}_{primary}(S_{activation\_nom})$), (see FIG. 5A) and the estimated primary gas chamber pressure at $S_{activation}$ (i.e., $\overline{P}_{primary}(S_{activation\_nom})$) is minimized. In various embodiments, the nominal value of the oil volume may be used as the initial estimate for the oil volume, which may improve the optimization convergence speed. A block diagram of the algorithm 600, described above, for shock strut oil volume determination is provided in FIG. 6.

The optimization loop may continue until the absolute difference between the estimated pressure and the measured pressure at $S_{activation\_nom}$ is less than or equal to a pre-determined threshold as follows:

$$|\hat{P}_{primary}(S_{activation\_nom}) - \overline{P}_{primary}(S_{activation\_nom})| \leq \text{Threshold 1} \quad \text{Eq. (2)}$$

When equation 2 is satisfied, the last estimate for the oil volume (i.e., $\nabla_{oil}$) may be recorded as the first estimation of the volume of oil 151 inside the oil chamber 150 at the shock strut stroke of zero. That is:

$$\{V_{oil}(0)\}_{1st\ estimation} = \overline{V}_{oil} \quad \text{Eq. (3)}$$

Figure 5B:
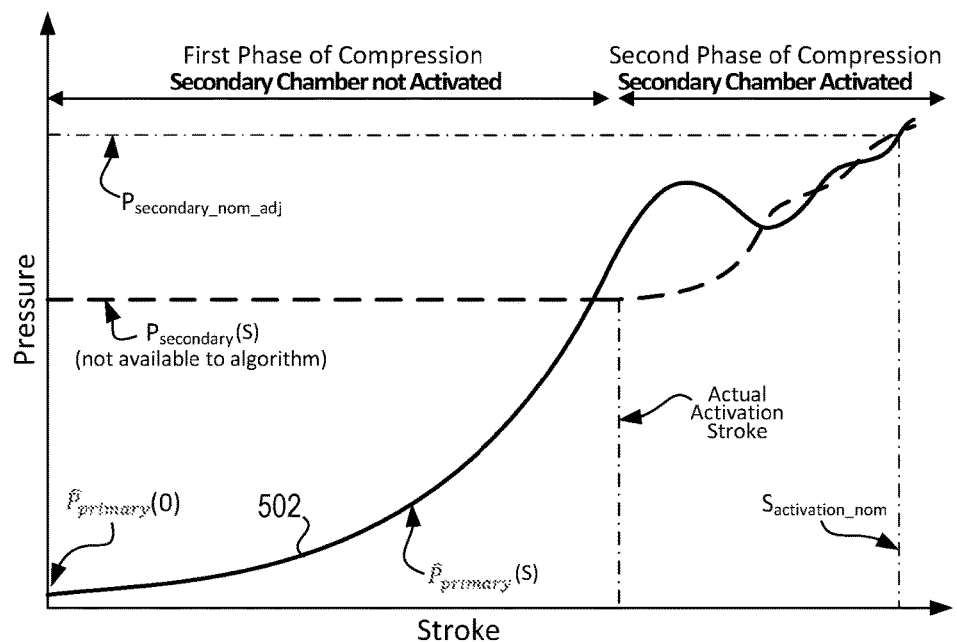
FIG. 5B illustrates a dynamic airspring curves of a primary gas chamber under a scenario where a significant loss of pressure in a secondary gas chamber has occurred, in accordance with various embodiments.

With reference to FIG. 5A, if a significant loss of pressure of secondary gas chamber 140 has not occurred, $S_{activation\_nom}$ may be less than the actual activation stroke due to effects of separator piston 132 inertia on the pressure versus stroke profile (i.e., airspring curve 502) of primary gas chamber 130 and equation 3 may generate an accurate estimation of the volume of oil 151 because the pressure vs. stroke values used for oil volume determination are associated with the first phase of compression in which the secondary gas chamber 140 is not activated. However, if a significant loss of pressure in secondary gas chamber 140 has occurred (e.g., a pressure loss of greater than 25%), the actual activation stroke could be smaller than $S_{activation\_nom}$, in which case equation 3 will under-estimate oil volume in oil chamber 150. For example, FIG. 5A illustrates a scenario where a significant loss of pressure of secondary gas chamber 140 has not occurred, while FIG. 5B illustrates a scenario where a significant loss of pressure in secondary gas chamber 140 has occurred. In FIG. 5B, the actual pressure in the secondary gas chamber 140 is much lower than the nominal pressure. In such a case, the actual activation stroke is less than the estimated activation stroke ($S_{activation\_nom}$).

In order to ensure that a loss in gas pressure in secondary gas chamber 140 does not cause erroneous results, monitoring system 200 may estimate the volume of oil in oil chamber 150 based on the gas pressure in primary gas chamber 130, as described below.

Figure 5C:
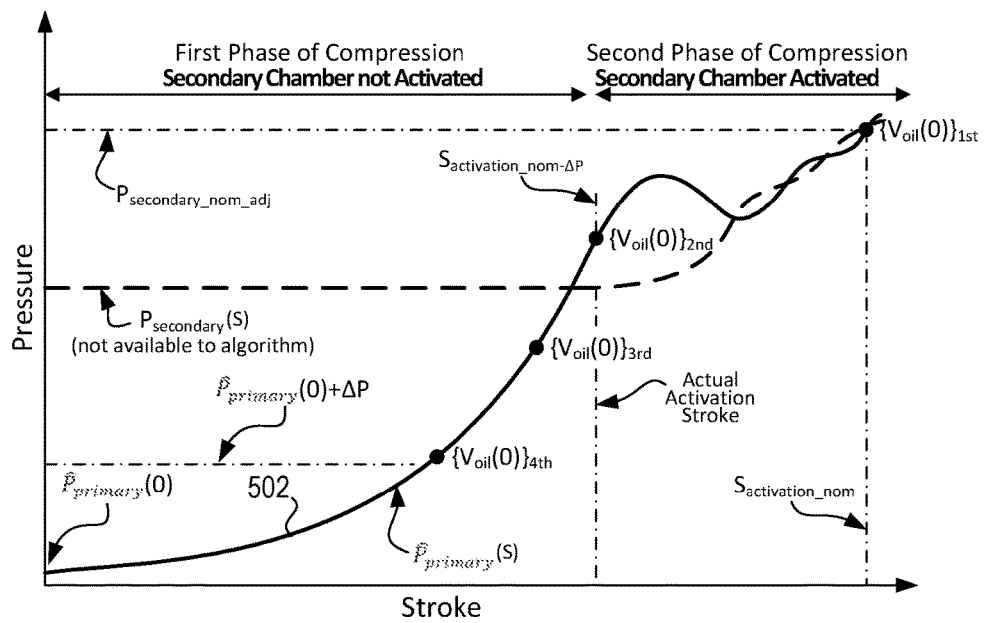
FIG. 5C illustrates a dynamic airspring curves of a primary gas chamber depicting pressure points used for estimating oil volume, in accordance with various embodiments.

With combined reference to FIG. 4B and FIG. 5C, a second pressure for primary gas chamber 130 may be determined. The second pressure may be a pre-determined value ($\Delta P$) less than $P_{secondary\_nom\_adj}$. For example, the pre-determined value ($\Delta P$) may be 100 psi (689.5 kPa) or any other pre-determined pressure value. The stroke associated with the second pressure value along the airspring curve 502 may be $S_{activation\_nom-\Delta P}$. With additional reference to FIG. 6, a second estimation for the oil volume may be made using algorithm 600. In this regard, health monitor 230 may use the primary chamber inflation pressure in the fully extended position (i.e., $\hat{P}_{primary}(0)$), the primary chamber temperature in the fully extended position (i.e., $\hat{T}_{primary}(0)$), the displacement volume of the primary gas chamber 130 at $S_{activation}$ (i.e., $S_{activation\_nom-\Delta P}*A_p$), the total volume of the primary gas chamber 130 and the oil chamber 150 (i.e., $V_{tot}-V_{secondary\_chamber\_nom}$), and an initial estimate for the volume of the oil in oil chamber 150 (i.e., $\hat{V}_{oil}$), and may compute the primary chamber gas pressure at $S_{activation\_nom-\Delta P}$. In this regard, although illustrated as being estimated at $S_{activation\_nom}$ in FIG. 6, algorithm 600 may also estimate pressure at $S_{activation\_nom-\Delta P}$. Using algorithm 600, as described above, the second estimation for oil volume 151 is made as follows:

$$\{V_{oil}(0)\}_{2nd\ estimation} = \overline{V}_{oil} \quad \text{Eq. (4)}$$

If $P_{secondary\_nom\_adj} - 2 \times \Delta P$ is greater than $P_{primary}(0) + \Delta P$, a third point on the primary chamber airspring curve 502 may also be identified using the same method and a third estimation for oil volume may be calculated. This iteration may continue for "n" times until the following condition is met:

$$P_{secondary\_nom\_adj} - n \times \Delta P \leq \hat{P}_{primary}(0) + \Delta P \qquad \text{Eq. (5)}$$

With reference to FIG. 5C, an illustration of airspring curve 502 is provided where four oil volume estimations have been made according to the procedure described. An error between each two subsequent estimations of oil volume may be computed as follows:

$$\text{error}_{i^{th}} = \frac{\{V_{oil}(0)\}_{i^{th}\,estimation} - \{V_{oil}(0)\}_{i+1^{th}\,estimation}}{\{V_{oil}(0)\}_{i^{th}\,estimation}} \times 100 \qquad \text{Eq. (6)}$$

For example, $$\text{error}_{1^{st}} = \frac{\{V_{oil}(0)\}_{1^{st}\,estimation} - \{V_{oil}(0)\}_{2^{nd}\,estimation}}{\{V_{oil}(0)\}_{1^{st}\,estimation}} \times 100$$

Next, volume of oil 151 may be determined using the following method:

If error$_{i^{th}}$<Threshold 2 for (i=1 to n)→V$_{oil}$(0)= $\{V_{oil}(0)\}_{1^{st}estimation}$ else $V_{oil}(0) = \{V_{oil}(0)\}_{x^{the}estimation}$ where (error$_{i^{th}}$<Threshold 2) for (i=x to n)
where Threshold 2 is a pre-determined value, such as 0.5% for example.

For example, if all error$_{i^{th}}$'s for (i=1 to n−1) are below Threshold 2, that implies that no significant loss of pressure has occurred and that the slope of airspring curve 502 has been maintained up to at least P$_{secondary\_nom\_adj}$. As a result, the first estimation of the oil volume may be taken as the actual volume of oil 151. Stated differently, V$_{oil}$(0)={V$_{oil}$(0)}$_{1^{st}\,estimation}$.

However, if there is an error$_{i^{th}}$ which is above Threshold 2, that implies that a significant loss of pressure in secondary gas chamber 140 has occurred and that the shape of airspring curve 502 has changed before reaching P$_{secondary\_nom\_adj}$. As a result, the first estimation of the oil volume may not be accurate. In this case, the oil volume will be equal to the x$^{th}$ estimation of oil volume where (error$_{i^{th}}$<Threshold 2) for (i=x to n−1). If no "x" can be defined, a servicing message may be logged in data logger 240, suggesting a significant loss of pressure in secondary gas chamber 140.

The method described above may be designed to provide the most accurate volume estimation for volume of oil 151 in oil chamber 150. If a significant loss of pressure occurs, secondary gas chamber 140 may be activated earlier during compression and as a result, the shock strut 100 stiffness may be reduced and the slope of the primary gas chamber pressure profile (i.e., airspring curve 502) may change earlier during compression which could potentially skew the oil volume estimation using P$_{secondary\_nom\_adj}$. However, a change in the slope may be reflected into oil volume estimations and consequently into error$_{i^{th}}$'s. In this regard, the provided method may capture an unexpected change in the slope of airspring curve 502 and ensure that the shock strut volume of oil 151 is estimated based on the primary gas chamber 130 pressure profile before the secondary gas chamber 140 is activated. This method may prevent an incorrect estimation of oil volume 151 in the case of pressure loss in secondary gas chamber 140 while providing the most accurate estimation of oil volume.

Primary Chamber Gas Level Determination:

Once the oil volume in the fully extended position is determined, the primary chamber gas volume in the fully extended position may be determined as follows:

$$V_{primary\_chamber}(0) = V_{tot} - V_{secondary\_chamber\_nom} - V_{oil}(0) \qquad \text{Eq. (7)}$$

where V$_{tot}$ is the total internal volume of the shock strut in the fully extended position and V$_{secondary\_chamber\_nom}$ is the nominal volume of the secondary chamber when its piston is bottomed out.

The number of moles of gas in the primary gas chamber 130 of the shock strut 100 may then be computed using the following equation:

$$n_{primary\_chamber} = \frac{\hat{P}_{primary}(0) \times V_{primary\_chamber}(0)}{R \times \hat{T}_{primary}(0) \times Z(\hat{P}_{primary}(0), \hat{T}_{primary}(0))} \qquad \text{Eq. (8)}$$

where R is the ideal gas constant and Z ($\hat{P}_{primary}(0)$, $\hat{T}_{primary}(0)$) is the nitrogen compressibility factor. The computed number of moles of gas in the primary gas chamber 130 may be then logged in the data logger 240. Although $\hat{P}_{primary}(0)$ and $\hat{T}_{primary}(0)$ are described herein as being measured during a landing event, it is contemplated herein that they may also be recorded after a take-off event. In various embodiments, $\hat{T}_{primary}(0)$ and $\hat{T}_{secondary}(0)$ at any point during a take-off event (e.g., detected by take-off detector 260 with momentary reference to FIG. 4C) or a landing event may be used. In this regard, $\hat{P}_{primary}(0)$ and $\hat{T}_{primary}(0)$ are primary chamber gas pressure and temperature, respectively, when the shock strut 100 is in the fully extended position (or within 25% of the fully extended position) recorded either during a landing event or a take-off event. It is noteworthy that instead of primary chamber temperature, $\hat{T}_{primary}(0)$, the secondary chamber temperature, $\hat{T}_{secondary}(0)$, may be used to calculate the number of moles of gas in the primary gas chamber 130.

Primary Chamber Oil Leakage Volume Determination:

Depending on the aircraft's sink-rate, dynamic weight on the landing gear and the shock strut internal fluid levels the primary chamber may or may not reach a maximum compression stroke (e.g., separator piston 132 may "bottom out") during a landing event. If the primary chamber does not reach a maximum compression stroke during the landing event, the maximum pressure achieved in the primary chamber will be equal to the maximum pressure in the secondary chamber at the maximum compression stroke. If the primary chamber reaches the maximum compression stroke, the secondary chamber pressure continues to increase while the primary chamber pressure drops due to thermal losses. Under both conditions, a maximum pressure value for the primary chamber can be found. Moreover, under both conditions, the secondary chamber pressure will be nearly equal to the primary chamber pressure when the primary chamber pressure reaches its maximum value.

In various embodiments, with combined reference to FIG. 4B and FIG. 5, monitoring system 200 may determine the maximum pressure (also referred to herein as the maximum primary chamber pressure) of primary gas chamber 130 during landing (i.e., $\hat{P}_{primary,max}$) and the shock strut stroke associated with said pressure (i.e., $\hat{S}_{primary,max}$). Once $\hat{P}_{primary,max}$ and $\hat{S}_{primary,max}$ are determined, the total volume of the primary and secondary chambers at $\hat{S}_{primary,max}$ may be determined, as follows:

$$V_{oil}(\hat{S}_{primary,max}) = V_{oil}(0) \times \left(1 - \frac{\hat{P}_{primary,max} - \hat{P}_{primary}(0)}{\beta}\right) \quad \text{Eq. (9)}$$

and $$V_{primary+secondary}(\hat{S}_{primary,max}) = V_{tot} - A_p \times \hat{S}_{primary,max} - V_{oil}(\hat{S}_{primary,max}) \quad \text{Eq. (10)}$$

where $\beta$ is the oil bulk modulus, $V_{tot}$ is the total internal volume of the shock strut in the fully extended position, and $A_p$ is the piston area. $V_{primary+secondary}(\hat{S}_{primary,max})$ is the total volume of the primary and secondary gas chambers at the stroke at which the primary chamber pressure reaches its maximum level during landing.

Figure 7:
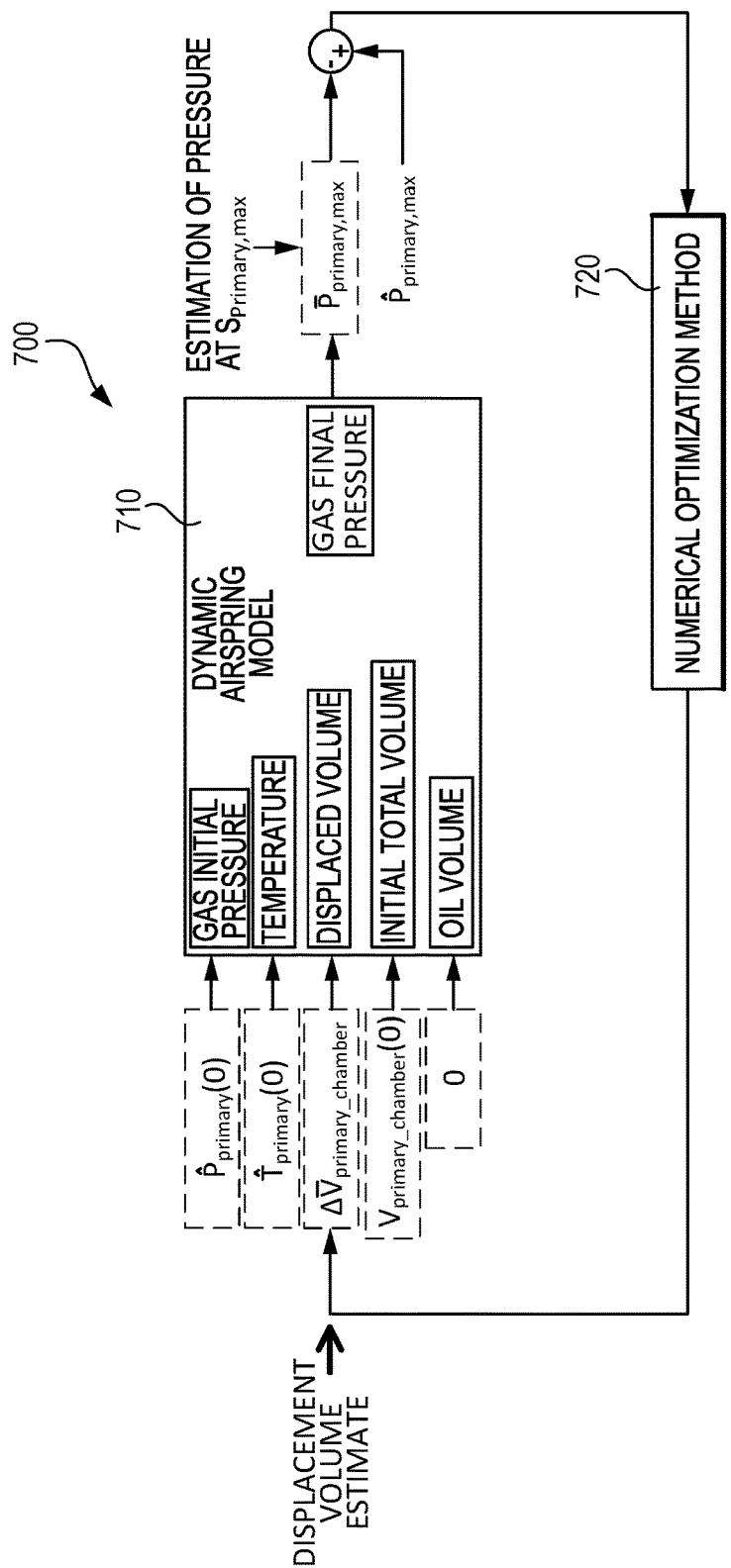
FIG. 7 illustrates an algorithm for estimating a displacement volume of a primary gas chamber, in accordance with various embodiments.

With combined reference to FIG. 4B and FIG. 7, monitoring system 200 may use a dynamic airspring model 710, along with a numerical optimization method 720 to estimate the displacement volume of the primary chamber at $\hat{S}_{primary,max}$. In this regard, FIG. 7 illustrates an algorithm 700 for estimating the displacement volume of the primary chamber at $\hat{S}_{primary,max}$. Dynamic airspring model 710 may generate an accurate estimation of transient gas pressure for a single-stage, separated gas/fluid shock strut for a displacement volume, if oil volume, initial temperature, initial gas pressure, and initial total internal volume are known. However, since the displacement volume is required for the model to work, the algorithm 700 provides an initial estimate for the displacement volume (i.e., $\Delta V_{primary\_chamber}$), computes the pressure at $\hat{S}_{primary,max}$, and then compares said pressure with the measured pressure at $\hat{S}_{primary,max}$. Stated differently, health monitor 230 may use the measured primary chamber inflation pressure in the fully extended position (i.e., $\overline{P}_{primary}(0)$), the primary chamber temperature in the fully extended position (i.e., $\hat{T}_{primary}(0)$), the initial estimate for the displacement volume of the primary gas chamber 130 (i.e., $\Delta V_{primary\_chamber}$), the total volume of the primary gas chamber 130, calculated by Eq. 5 (i.e., $V_{primary\_chamber}(0)$), and an oil volume of zero, and may compute the primary chamber gas pressure at $\hat{S}_{primary,max}$.

A gradient free, single-variable, numerical optimization technique, such as Bisection or Line Search methods may be used to adjust the initial estimate for displacement volume so that the difference between the measured primary gas chamber pressure at $\hat{S}_{primary,max}$ (i.e., $\hat{P}_{primary,max}$, (see FIG. 5) and the estimated primary gas chamber pressure at $\hat{S}_{primary,max}$ (i.e., $\overline{P}_{primary,max}$ is minimized.

The optimization loop may continue until the absolute difference between the estimated pressure and the measured pressure at $S_{primary,max}$ is less than or equal to a predetermined threshold as follows:

$$|\hat{P}_{primary,max} - \overline{P}_{primary,max}| \leq \text{Threshold 3} \quad \text{Eq. (11)}$$

When equation 9 is satisfied, the last estimate for the displacement volume of the primary gas chamber (i.e., $\Delta V_{primary\_chamber}$) may be recorded and the gas volume in the primary gas chamber 130 at $\hat{S}_{primary,max}$ may be determined as follows:

$$V_{primary\_chamber}(\hat{S}_{primary,max}) = V_{primary\_chamber}(0) - \Delta V_{primary\_chamber} \quad \text{Eq. (12)}$$

If $V_{primary\_chamber}(\hat{S}_{primary,max})$ is larger than the primary chamber dead volume (i.e., $V_{primary\_chamber\_dead}$), no conclusion may be made regarding the possible oil leakage into the primary chamber. If $V_{primary\_chamber}(\hat{S}_{primary,max})$ is smaller or equal to the primary chamber dead volume, then the volume of oil leakage into the primary chamber (also referred to herein as the primary chamber oil leakage volume) is estimated as follows:

If $V_{primary\_chamber}(\hat{S}_{primary,max}) \leq V_{primary\_chamber\_dead}$,
$V_{primary\_chamber\_leakage} = V_{primary\_chamber\_dead} - V_{primary\_chamber}(\hat{S}_{primary,max})$ Eq. (13)

Secondary Chamber Gas Level Determination:

Although a direct measurement of gas pressure in the secondary gas chamber 140 is not available to the monitoring system 200, the method outlined below may estimate the inflation pressure of secondary gas chamber 140 in the fully extended position, assuming a zero oil leakage into the secondary gas chamber 140. Because the secondary gas chamber 140 has a higher or equal pressure to the oil chamber during an aircraft full operation cycle, and is located at the top of the oil chamber, leakage of oil into secondary gas chamber 140 is unlikely, and thus the assumption is deemed to be valid. In various embodiments, with reference to FIG. 4B, the secondary gas chamber 140 gas level may be determined. In this step, the relationship between the pressures in the primary gas chamber 130 and the secondary gas chamber 140 is taken advantage of and the gas pressure in the secondary gas chamber 140 follows at $\hat{S}_{primary,max}$ is calculated as:

$$P_{secondary@\hat{S}_{primary,max}} = \hat{P}_{primary,max} \quad \text{Eq. (14)}$$

Then, the monitoring system 200 may compute the volume of the secondary gas chamber 140 at the stroke of $\hat{S}_{primary,max}$ as follow:

$$V_{secondary\_chamber}(\hat{S}_{primary,max}) = V_{primary+secondary}(\hat{S}_{primary,max}) - V_{primary\_chamber}(\hat{S}_{primary,max}) \quad \text{Eq. (15)}$$

and the displacement volume of the secondary gas chamber 140 at $\hat{S}_{primary,max}$ may be determined as follows:

$$\Delta V_{secondary\_chamber} = V_{secondary\_chamber\_norm} - V_{secondary\_chamber}(\hat{S}_{primary,max}) \quad \text{Eq. (16)}$$

Figure 8:
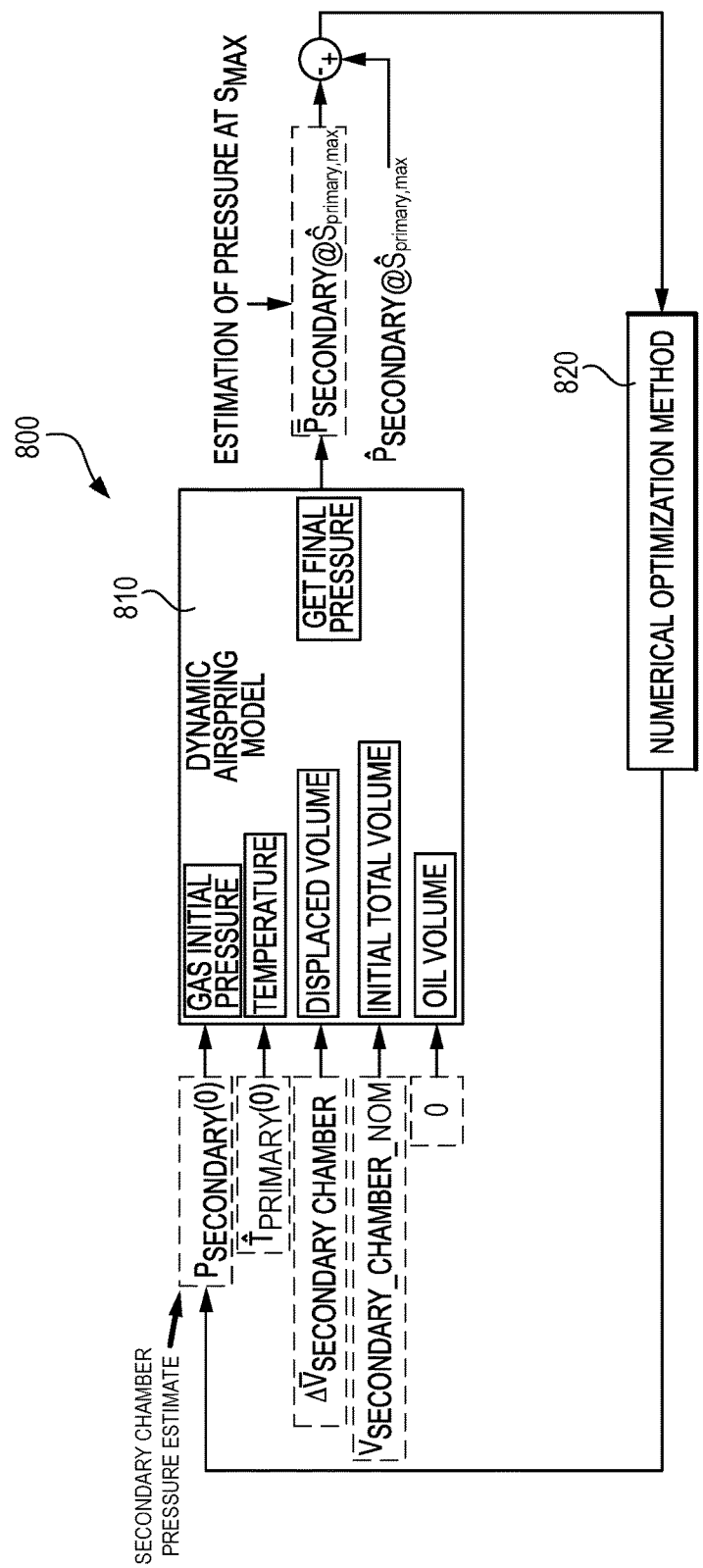
FIG. 8 illustrates an algorithm for estimating a secondary chamber inflation pressure, in accordance with various embodiments; and FIG. 9A

With combined reference to FIG. 4B and FIG. 8, health monitor 230 may use a dynamic airspring model 810, along with a numerical optimization method 820 to estimate gas pressure in the secondary gas chamber 140. In this regard, FIG. 8 illustrates an algorithm 800 for estimating the inflation pressure of secondary gas chamber 140 knowing the displacement volume of secondary gas chamber 140 at $\hat{S}_{primary,max}$ (i.e., $\Delta V_{secondary\_chamber}$). It is assumed that the oil leakage into the secondary chamber is zero and that the gas temperature in the secondary gas chamber 140 is the same as the gas temperature in the primary gas chamber 130, which is measured by the temperature sensor.

Health monitoring 230 may use the primary gas chamber temperature (i.e., $\hat{T}_{primary}(0)$), the displacement volume of the secondary gas chamber 140 at $\hat{S}_{primary,max}$, computed by equation 16, the nominal volume of the secondary gas chamber 140 with its piston bottomed out (i.e., $V_{secondary\_chamber\_0}$), an oil leakage into the secondary gas chamber 140 of zero, and an initial guess for the secondary gas chamber inflation pressure (i.e., $P_{secondary}(0)$), and may compute the secondary chamber pressure at $\hat{S}_{primary,max}$.

A gradient free, single-variable, numerical optimization technique, such as Bisection or Line Search methods may be used to adjust the initial estimate for the inflation pressure so that the difference between the measured primary gas chamber pressure at $\hat{S}_{primary,max}$ (i.e., $\hat{P}_{primary}(\hat{S}_{primary,max}) = P_{Secondary}(\hat{S}_{primary,max})$) and the estimated secondary gas chamber pressure at $\hat{S}_{primary,max}$ (i.e., $\overline{P}_{Secondary@\hat{S}_{primary,max}}$) is minimized.

The optimization loop may continue until the absolute difference between the estimated pressure and the measured pressure at $\hat{S}_{primary,max}$ is less than or equal to a predetermined threshold as follows:

$$|\hat{P}_{secondary@\hat{S}_{primary,max}} - \overline{P}_{secondary@\hat{S}_{primary,max}}| \leq \text{Threshold 4} \qquad \text{Eq. (17)}$$

When equation 14 is satisfied, the last estimate for the inflation pressure (i.e., $P_{Secondary}(0)$) may be recorded.

The number of moles of gas in the secondary gas chamber 140 of the shock strut 100 may then be computed using the following equation:

$$n_{secondary\_chamber} = \frac{P_{secondary}(0) \times V_{secondary\_chamber\_0}}{R \times \hat{T}_{primary}(0) \times Z(P_{secondary}(0), \hat{T}_{primary}(0))} \qquad \text{Eq. (18)}$$

where R is the ideal gas constant and Z is the nitrogen compressibility factor (or the compressibility factor for the type of gas used in shock strut 100). The computed number of moles of gas in the secondary gas chamber 140 may be then logged in the data logger 240. $\hat{P}_{secondary}(0)$ and $\hat{T}_{primary}(0)$ are the secondary chamber inflation pressure and primary chamber temperature, respectively, with the shock strut 100 in the fully extended position (or within 25% of the fully extended position) associated with a landing or take-off event.

Shock Strut Servicing State Determination:

In the next step, the oil volume may be adjusted to a reference temperature, such as 20° C. (68° F.) using the following thermal model:

$$V_{oil@T_{ref}} = V_{oil} \times (1 + dT \times \alpha \times \text{sign}(T_{ref} - T_{oil}))^{\frac{|T_{ref} - T_{oil}|}{dT}} \qquad \text{Eq. (19)}$$

where $\alpha$ is the oil thermal expansion coefficient, dT is a numerical integration step, and $T_{oil}$ is the oil temperature. $T_{oil}$ may be derived from $\hat{T}_{primary}$ or $\hat{T}_{secondary}$. The oil volume computed above may be then logged in the data logger 240.

The deviation of the oil volume 151 from the nominal oil volume may be computed as follows:

$$\% \text{ oil} = \frac{V_{oil@T_{ref}} - V_{oil\_nom}}{V_{oil\_nom}} \qquad \text{Eq. (20)}$$

where $V_{oil\_nom}$ is the nominal oil volume which is known to the algorithm. In various embodiments, the nominal oil volume may be a desired volume of the oil volume 151 of shock strut 100. The deviation of the oil volume 151 from the nominal oil volume may be logged in data logger 240.

In the next step, the estimated oil volume at the reference temperature (output of Eq. 17) may be compared with a plurality of thresholds, such as four thresholds as used in the example herein, to determine if the estimated oil volume is acceptable and a proper servicing message may be issued as follows:

if $V_{oil@T_{ref}} > V_{threshold,1} \rightarrow$ oil is extremely overserviced, re-servicing is required if $V_{threshold,1} \geq V_{oil@T_{ref}} > V_{threshold,2} \rightarrow$ oil is overserviced, re-servicing is recommended if $V_{threshold,2} \geq V_{oil@T_{ref}} > V_{threshold,3} \rightarrow$ oil volume is ok—no action is required if $V_{threshold,3} \geq V_{oil@T_{ref}} > V_{threshold,4} \rightarrow$ oil is underserviced—prepare for servicing if $V_{threshold,4} \geq V_{oil@T_{ref}} \rightarrow$ oil is extremely underserviced—servicing is required.

The issued servicing message may be logged in the data logger 240.

In the next step, the number of moles of gas in the primary gas chamber 130 estimated by Eq. (6) may be compared with the nominal number of moles of gas calculated with the following equation:

$$n_{primary\_chamber\_nominal} = \frac{P_{primary\_nom} \times V_{primary\_chamber\_0}}{R \times T_{ref} \times Z(P_{primary\_nom}, T_{ref})} \qquad \text{Eq. (21)}$$

The deviation of the primary chamber gas level from the nominal value may be computed as follows:

$$\% \text{ primary}_{gas} = \frac{n_{primary\_chamber} - n_{primary\_chamber\_nominal}}{n_{primary\_chamber\_nominal}} \qquad \text{Eq. (22)}$$

The deviation of the primary gas level from the nominal level may be logged in data logger 240.

The estimated number of moles of gas in the primary gas chamber 130 may be compared with a plurality of thresholds, such as four thresholds as used in the example herein, and a proper servicing message is issued as follows:

if $n_{primary\_chamber} > n_{primary,threshold,1} \rightarrow$ primary chamber is extremely overserviced, re-servicing is required if $n_{primary,threshold,1} \leq n_{primary\_chamber} > n_{primary,threshold,2} \rightarrow$ primary chamber is overserviced, re-servicing is recommended if $n_{primary,threshold,2} \geq n_{primary\_chamber} > n_{primary,threshold,3} \rightarrow$ primary chamber gas level is ok—no action is required if $n_{primary,threshold,3} \geq n_{primary\_chamber} > n_{primary,threshold,4} \rightarrow$ primary chamber is underserviced—prepare for servicing if $n_{primary,threshold,4} \geq n_{primary-chamber} \rightarrow$ primary chamber is extremely underserviced—servicing is required.

The issued servicing message may be logged in data logger 240.

In the next step, the number of moles of gas in the secondary gas chamber 140 estimated by Eq. (14) may be compared with the nominal number of moles of gas calculated with the following equation:

$$n_{secondary\_chamber\_nominal} = \frac{P_{secondary\_nom} \times V_{secondary\_chamber\_0}}{R \times T_{ref} \times Z(P_{secondary\_nom}, T_{ref})} \qquad \text{Eq. (23)}$$

The deviation of the secondary chamber gas level from the nominal value may be computed as follows:

$$\% \text{ secondary\_gas} = \frac{n_{secondary\_chamber} - n_{secondary\_chamber\_nominal}}{n_{secondary\_chamber\_nominal}} \qquad \text{Eq. (24)}$$

The deviation of the secondary gas level from the nominal level may be logged in data logger 240.

The estimated number of moles of gas in the secondary gas chamber 140 may be compared with four thresholds (or any other number of thresholds) and a proper servicing message may be issued as follows:

if $n_{secondary\_chamber} > n_{secondary,threshold,1} \rightarrow$ secondary chamber is extremely overserviced, re-servicing is required if $n_{secondary,threshold,1} \geq n_{secondary\_chamber} >$ $n_{secondary,threshold,2} \rightarrow$ secondarychamber is overserviced, re—servicing is recommended if $n_{secondary,threshold,2} \geq n_{secondary\_chamber} >$ $n_{secondary,threshold,3} \rightarrow$ secondarychamber gas level is ok—no action is required if $n_{secondary,threshold,3} \geq n_{secondary\_chamber} >$ $n_{secondary,threshold,4} \rightarrow$ secondarychamber is underserviced—prepare for servicing if $n_{secondary,threshold,4} \geq n_{secondary\_chamber} \rightarrow$ secondary-chamber is extremely underserviced—servicing is required. The issued servicing message may be logged in data logger 240.

The volume of oil leakage into the primary gas chamber 130 (calculated by Eq. 13) may be compared with a plurality of thresholds and a proper servicing message may be issued as follows:

if $V_{primary\_chamber\_leakage\_threshold\_1} >$ $V_{primary\_chamber\_leakage} \rightarrow$ no leakage, no action is required if $V_{primary\_chamber\_leakage\_threshold\_2} >$ $V_{primary\_chamber\_leakage} \geq$ $V_{primary\_chamber\_leakage\_threshold\_1} \rightarrow$ some leakage into the primary chamber, prepare for inspection if $V_{primary\_chamber\_leakage} \geq$ $V_{primary\_chamber\_leakage\_threshold\_2} \rightarrow$ excessive leakage into the primary chamber, inspection is required The issued servicing message may be logged in data logger 240.

Figure 9A:
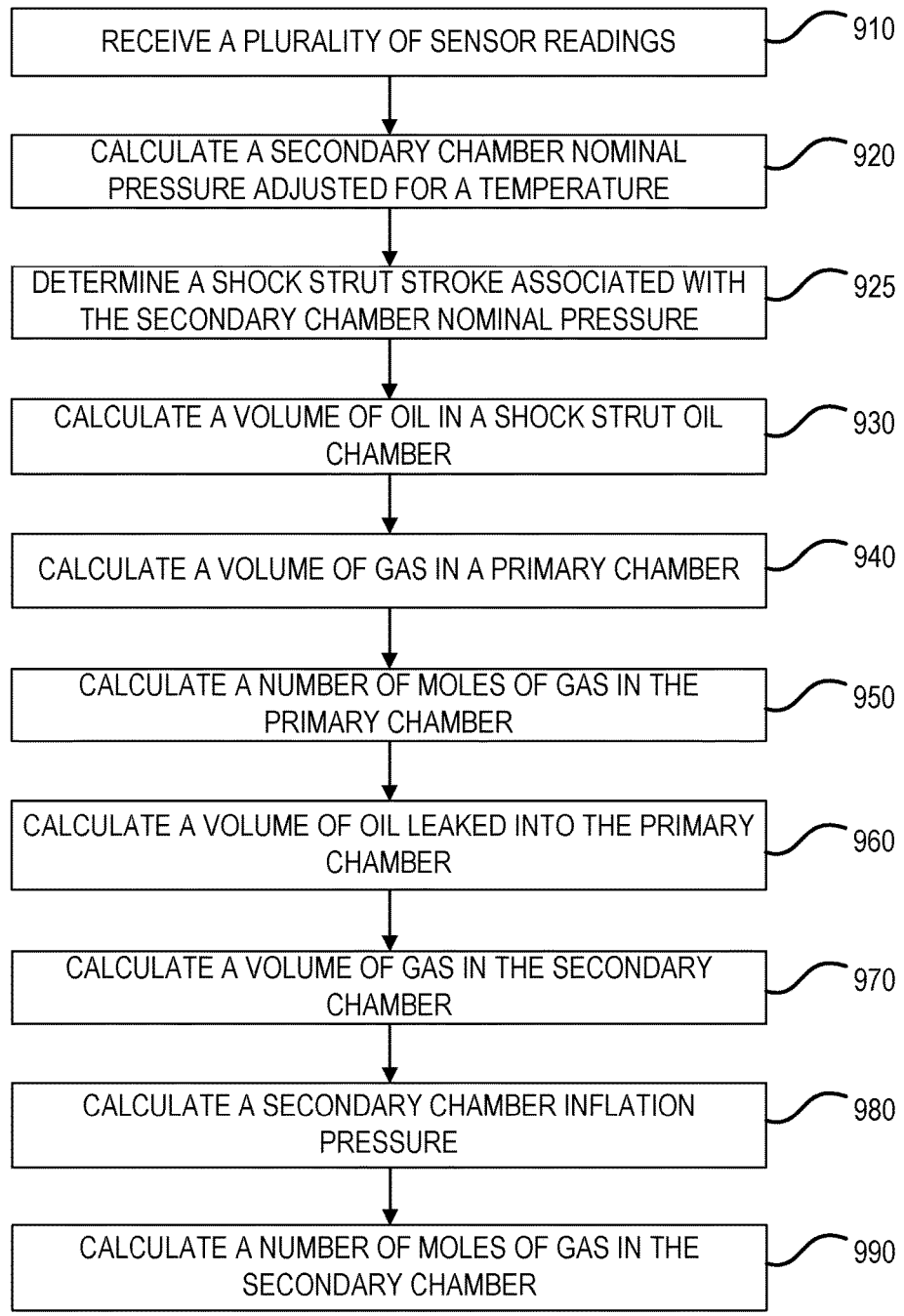
FIG. 9B illustrates a method for monitoring a dual-stage, separated gas/fluid shock strut, in accordance with various embodiments.

With reference to FIG. 9A, a method 900 for monitoring a shock strut is provided, in accordance with various embodiments. Method 900 includes receiving a plurality of sensor readings (step 910). Method 900 includes calculating a secondary chamber nominal pressure adjusted for a temperature (step 920). Method 900 includes determining a shock strut stroke associated with the secondary chamber nominal pressure (step 925). Method 900 includes calculating a volume of oil in an oil chamber (step 930). Method 900 includes calculating a volume of gas in a primary chamber (step 940). Method 900 includes calculating a number of moles of gas in the primary chamber (step 950). Method 900 includes calculating a volume of oil leaked into the primary chamber (step 960). Method 900 includes calculating a volume of gas in a secondary chamber (step 970). Method 900 includes calculating a secondary chamber inflation pressure (step 980). Method 900 includes calculating a number of moles of gas in the secondary chamber (step 990).

With combined reference to FIG. 4A, FIG. 4B, and FIG. 9A, step 910 may include receiving, by controller 201, primary chamber gas pressure 250, primary chamber gas temperature 252, and/or shock strut stroke 258. Step 920 may include calculating, by controller 201, $P_{secondary\_nom\_adj}$ using equation 1, as described herein. Step 925 may include determining, by controller 201, $S_{activation\_nom}$ using dynamic airspring curve 502 to determine the stroke (i.e., $S_{activation\_nom}$) corresponding to $P_{secondary\_nom\_adj}$, as described herein. In this regard, controller 201 may determine $S_{activation\_nom}$ based upon the primary chamber temperature sensor reading and the shock strut stroke sensor reading. Step 930 may include calculating, by controller 201, volume of oil 151 using algorithm 600 (see FIG. 6), as described herein.

Figure 9B:
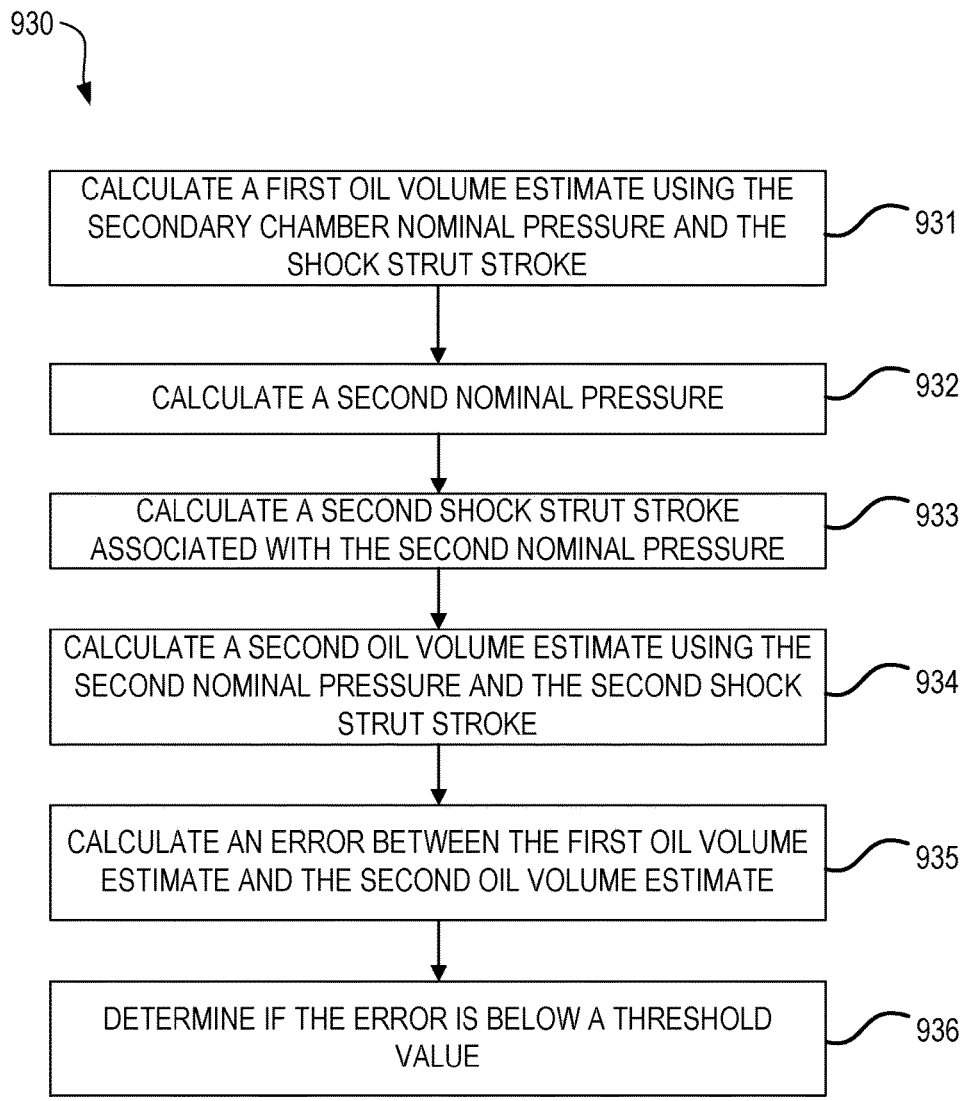

With additional reference to FIG. 9B, step 930 may further include sub-step 931 through sub-step 936. In this regard, step 930 may include calculating a first oil volume estimate using the secondary chamber nominal pressure and the shock strut stroke (sub-step 931). Sub-step 931 may include calculating, by controller 201, $\{V_{oil}(0)\}_{1st\ estimation}$ using algorithm 600 (see FIG. 6) and $P_{secondary\_nom\_adj}$ calculated in step 920 and $S_{activation\_nom}$ calculated in step 925 and using equation 3, as described herein. Step 930 may include calculating a second nominal pressure (sub-step 932). Sub-step 932 may include calculating, by controller 201, $P_{secondary\_nom\_adj-\Delta P}$, as described herein. Step 930 may include calculating a second shock strut stroke associated with the second nominal pressure (sub step 933). Sub-step 933 may include determining, by controller 201, $S_{activation\_nom-\Delta P}$ using dynamic airspring curve 502 to determine the shock strut stroke (i.e., $S_{activation\_nom-\Delta P}$) corresponding to $P_{secondary\_nom\_adj-\Delta P}$, as described herein. Step 930 may include calculating a second oil volume estimate using the second nominal pressure and the second shock strut stroke (sub-step 934). Sub-step 931 may include calculating, by controller 201, $\{V_{oil}(0)\}_{2nd\ estimation}$ using algorithm 600 (see FIG. 6) and $P_{secondary\_nom\_adj}$ calculated in step 920 and $S_{activation\_nom}$ calculated in step 925 and using equation 4, as described herein. Step 930 may include calculating an error between the first oil volume estimate and the second oil volume estimate (sub-step 935). Sub-step 935 may include calculating, by controller 201, $error_{i^{th}}$ using equation 6, as described herein. Step 930 may include determining if the error is less than or equal to a threshold value (sub-step 936). Sub-step 936 may include determining if $error_{i^{th}} <$ Threshold 2, as described herein.

With combined reference to FIG. 4A, FIG. 4B, and FIG. 9A, step 940 may include calculating, by controller 201, volume of gas 131 in primary gas chamber 130, as described herein. Step 950 may include calculating, by controller 201, a number of moles of gas in the primary gas chamber 130 using Eq. 8, as described herein. Step 960 may include calculating, by controller 201, a volume of oil leaked into the primary gas chamber 130 (i.e., $V_{primary\_chamber\_leakage}$) using equation 13, as described herein. Step 970 may include calculating, by controller 201, a volume of gas 141 in secondary gas chamber 140 using equation 15, as described herein. Step 980 may include calculating, by controller 201, secondary chamber inflation pressure (i.e., $P_{Secondary}(0)$) as described herein with respect FIG. 8 and equations 14 through equation 17. Step 990 may include calculating, by controller 201, a number of moles of gas in the secondary gas chamber 140, using equation 23, as described herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A monitoring system for a dual-stage, separated gas/fluid shock strut, comprising:
    a controller; and
        a tangible, non-transitory memory configured to communicate with the controller, the tangible, non-transitory memory having instructions stored thereon that, in response to execution by the controller, cause the controller to perform operations comprising:
        receiving, by the controller, a primary chamber temperature sensor reading from a temperature sensor coupled to a primary chamber of the dual-stage, separated gas/fluid shock strut;
        receiving, by the controller, a primary chamber pressure sensor reading from a pressure sensor coupled to the primary chamber of the dual-stage, separated gas/fluid shock strut;
        receiving, by the controller, a shock strut stroke sensor reading from a stroke sensor;
        calculating, by the controller, a secondary chamber nominal pressure based upon the primary chamber temperature sensor reading;
        determining, by the controller, a shock strut stroke associated with the secondary chamber nominal pressure;
        calculating, by the controller, a volume of oil in an oil chamber of the dual-stage, separated gas/fluid shock strut based upon the shock strut stroke associated with the secondary chamber nominal pressure;
        calculating, by the controller, a volume of gas in a primary chamber of the dual-stage, separated gas/fluid shock strut based upon at least the volume of oil;
        calculating, by the controller, a secondary chamber inflation pressure;
        calculating, by the controller, a volume of oil leaked into the primary chamber of the dual-stage, separated gas/fluid shock strut, based upon the secondary chamber inflation pressure;
        comparing, by the controller, the volume of oil leaked into the primary chamber with a plurality of threshold values; and
        issuing, by the controller, a servicing message, in response to the comparing.

2. The monitoring system of claim 1, wherein the instructions cause the controller to perform further operations comprising:
    calculating, by the controller, a number of moles of gas in the primary chamber of the dual-stage, separated gas/fluid shock strut, based upon at least the volume of gas in the primary chamber.

3. The monitoring system of claim 2, wherein the instructions cause the controller to perform further operations comprising:
    calculating, by the controller, a volume of gas in a secondary chamber of the dual-stage, separated gas/fluid shock strut; and
    calculating, by the controller, a number of moles of gas in the secondary chamber of the dual-stage, separated gas/fluid shock strut, based upon at least the volume of gas in the secondary chamber.

4. The monitoring system of claim 3, wherein the instructions cause the controller to perform further operations comprising:
    calculating, by the controller, a displacement volume of the secondary chamber of the dual-stage, separated gas/fluid shock strut.

5. The monitoring system of claim 3, wherein the instructions cause the controller to perform further operations comprising at least one of:
    comparing, by the controller, the volume of oil in the oil chamber with a plurality of threshold values;
    comparing, by the controller, the number of moles of gas in the primary chamber with a plurality of threshold values; and comparing, by the controller, the number of moles of gas in the secondary chamber with a plurality of threshold values.

6. The monitoring system of claim 1, wherein the calculating, by the controller, the volume of oil comprises:

calculating, by the controller, a first oil volume estimate using the secondary chamber nominal pressure and the shock strut stroke associated with the secondary chamber nominal pressure;

calculating, by the controller, a second secondary chamber nominal pressure;

determining, by the controller, a second shock strut stroke associated with the second secondary chamber nominal pressure; and calculating, by the controller, a second oil volume estimate using the second secondary chamber nominal pressure and the second shock strut stroke associated with the secondary chamber nominal pressure.

7. The monitoring system of claim 6, wherein the calculating, by the controller, the volume of oil comprises:

calculating, by the controller, an error between the first oil volume estimate and the second oil volume estimate; and determining, by the controller, when the error is less than or equal to a threshold value.

8. The monitoring system of claim 7, wherein the controller determines the volume of oil in the oil chamber to be the first oil volume estimate in response to the error being less than or equal to the threshold value.

9. The monitoring system of claim 1, wherein the secondary chamber nominal pressure is adjusted according to the primary chamber temperature sensor reading.

10. The monitoring system of claim 1, wherein the instructions cause the controller to perform further operations comprising adjusting the volume of oil in the oil chamber to a reference temperature.

11. The monitoring system of claim 1, wherein the instructions cause the controller to perform further operations comprising calculating, by the controller, a deviation of the volume of oil in the primary chamber from a nominal oil volume level for the oil chamber.

* * * * *